US008919301B2

(12) United States Patent
Palazzolo et al.

(10) Patent No.: US 8,919,301 B2
(45) Date of Patent: Dec. 30, 2014

(54) CYLINDER BLOCK ASSEMBLY

(75) Inventors: Christopher K. Palazzolo, Ann Arbor, MI (US); Darren Sipila, Chesterfield, MI (US); Steve Poe, Canton, MI (US); Philip D. Cierpial, Grosse Pointe Park, MI (US); Changsheng Gan, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 504 days.

(21) Appl. No.: 13/270,106

(22) Filed: Oct. 10, 2011

(65) Prior Publication Data

US 2012/0167854 A1 Jul. 5, 2012

Related U.S. Application Data

(60) Provisional application No. 61/428,119, filed on Dec. 29, 2010.

(51) Int. Cl.
| | | |
|---|---|---|
| *F02B 75/18* | (2006.01) | |
| *F02F 1/00* | (2006.01) | |
| *F02F 7/00* | (2006.01) | |
| *F01M 11/02* | (2006.01) | |
| *B22D 19/00* | (2006.01) | |
| *F02F 1/14* | (2006.01) | |
| *F02F 1/16* | (2006.01) | |
| *F02B 75/22* | (2006.01) | |
| *F02F 1/10* | (2006.01) | |
| *F02F 1/24* | (2006.01) | |
| *F02F 1/20* | (2006.01) | |
| *F01P 3/02* | (2006.01) | |

(52) U.S. Cl.
CPC .............. *F02F 7/0012* (2013.01); *F01M 11/02* (2013.01); *B22D 19/0009* (2013.01); *F02F 1/14* (2013.01); *F02F 1/004* (2013.01); *F02B 2075/1816* (2013.01); *F02F 1/16* (2013.01); *F02B 75/22* (2013.01); *F02F 1/108* (2013.01); *F02F 2001/247* (2013.01); *F05C 2201/021* (2013.01); *F02F 1/20* (2013.01); *F01P 3/02* (2013.01)
USPC ..................................... 123/41.74; 123/193.2

(58) Field of Classification Search
CPC ....... F01P 3/02; F02F 2001/247; F02F 1/108; F02F 1/14; F02F 1/004; F02F 1/20; F02F 1/16; F02B 2075/1816; F02B 75/22; B22D 19/0009; F05C 2201/021
USPC ........................................... 123/193.2, 41.74
See application file for complete search history.

(56) References Cited

U.S. PATENT DOCUMENTS

| | | | |
|---|---|---|---|
| 3,263,402 | A | 8/1966 | Lindamood et al. |
| 4,237,847 | A | 12/1980 | Baugh et al. |

(Continued)

FOREIGN PATENT DOCUMENTS

| | | |
|---|---|---|
| EP | 0274393 B1 | 7/1988 |
| EP | 0291358 B1 | 11/1988 |

(Continued)

OTHER PUBLICATIONS

Frank Acierno Valencia et al., "Integrated Positive Crankcase Ventilation Vent," U.S. Appl. No. 13/270,123, filed Oct. 10, 2011, 47 pages.

(Continued)

*Primary Examiner* — Lindsay Low
*Assistant Examiner* — Charles Brauch
(74) *Attorney, Agent, or Firm* — Julia Voutyras; Alleman Hall McCoy Russell & Tuttle LLP

(57) ABSTRACT

A cylinder block including a cylinder and two crankshaft supports at a bottom of the cylinder block is described. The cylinder block may be coupled to a structural frame such that the cylinder block is lubricated through the structural frame. The cylinder block may reduce vehicle weight and cost.

20 Claims, 20 Drawing Sheets

(56) References Cited

U.S. PATENT DOCUMENTS

| | | | |
|---|---|---|---|
| 4,790,287 | A | 12/1988 | Sakurai et al. |
| 5,190,005 | A | 3/1993 | Saito et al. |
| 5,247,915 | A | 9/1993 | Sasada et al. |
| 5,357,922 | A | 10/1994 | Han |
| 6,070,562 | A | 6/2000 | Van Bezeij |
| 6,684,845 | B2 | 2/2004 | Cho |
| 7,367,294 | B2 | 5/2008 | Rozario et al. |
| 7,419,554 | B2 | 9/2008 | Eriksson et al. |
| 7,509,936 | B2 | 3/2009 | Weinzierl et al. |
| 2002/0020368 | A1 | 2/2002 | Fujimoto et al. |
| 2004/0079317 | A1* | 4/2004 | Koyama ............... 123/193.2 |
| 2005/0087154 | A1 | 4/2005 | Hayman et al. |
| 2005/0217618 | A1* | 10/2005 | Watanabe et al. ........... 123/78 F |
| 2006/0090718 | A1* | 5/2006 | Vattaneo et al. ........... 123/90.16 |
| 2007/0137606 | A1 | 6/2007 | Takahashi et al. |
| 2007/0181371 | A1* | 8/2007 | Virr ............................ 184/6.5 |
| 2008/0053420 | A1* | 3/2008 | Kamiyama ............... 123/78 R |
| 2009/0041398 | A1 | 2/2009 | Tanaka et al. |
| 2010/0050977 | A1 | 3/2010 | Park |
| 2010/0101514 | A1 | 4/2010 | Hirano et al. |

FOREIGN PATENT DOCUMENTS

| | | | |
|---|---|---|---|
| EP | 0368478 | B1 | 5/1990 |
| EP | 0411319 | B1 | 2/1991 |
| EP | 0476506 | B1 | 3/1992 |
| EP | 0476706 | B1 | 3/1992 |
| EP | 0837236 | B1 | 4/1998 |
| EP | 1160438 | A2 | 12/2001 |
| EP | 1298295 | B1 | 4/2003 |
| EP | 1361355 | A1 | 11/2003 |
| EP | 1482135 | A2 | 12/2004 |
| EP | 2063085 | B1 | 5/2009 |
| GB | 712869 | | 8/1954 |
| JP | 5019543 | A | 1/1993 |
| JP | 5263653 | A | 10/1993 |
| JP | 5263654 | A | 10/1993 |
| JP | 5321760 | A | 12/1993 |
| JP | 8200154 | A | 8/1996 |
| JP | 9195870 | A | 7/1997 |
| JP | 10054298 | A | 2/1998 |
| JP | 10061485 | A | 3/1998 |
| JP | 10196451 | A | 7/1998 |
| JP | 10266892 | A | 10/1998 |
| JP | 2001317534 | | 11/2001 |
| JP | 2007064081 | A | 3/2007 |
| JP | 2007239497 | A | 9/2007 |

OTHER PUBLICATIONS

Christopher K. Palazzolo et al., "Cylinder Block Assembly," U.S. Appl. No. 13/270,088, filed Oct. 10, 2011, 50 pages.

Christopher K. Palazzolo et al., "Cylinder Block," U.S. Appl. No. 13/270,098, filed Oct. 10. 2011, 47 pages.

Christopher K. Palazzolo et al., "Structural Frame," U.S. Appl. No. 13/270,100, filed Oct. 10, 2011, 46 pages.

Christopher K. Palazzolo et al., "Cylinder Block Assembly," U.S. Appl. No. 13/270,131, filed Oct. 10, 2011, 53 pages.

Christopher K. Palazzolo et al., "Cylinder Block Assembly," U.S. Appl. No. 13/270,110, filed Oct. 10, 2011, 64 pages.

* cited by examiner

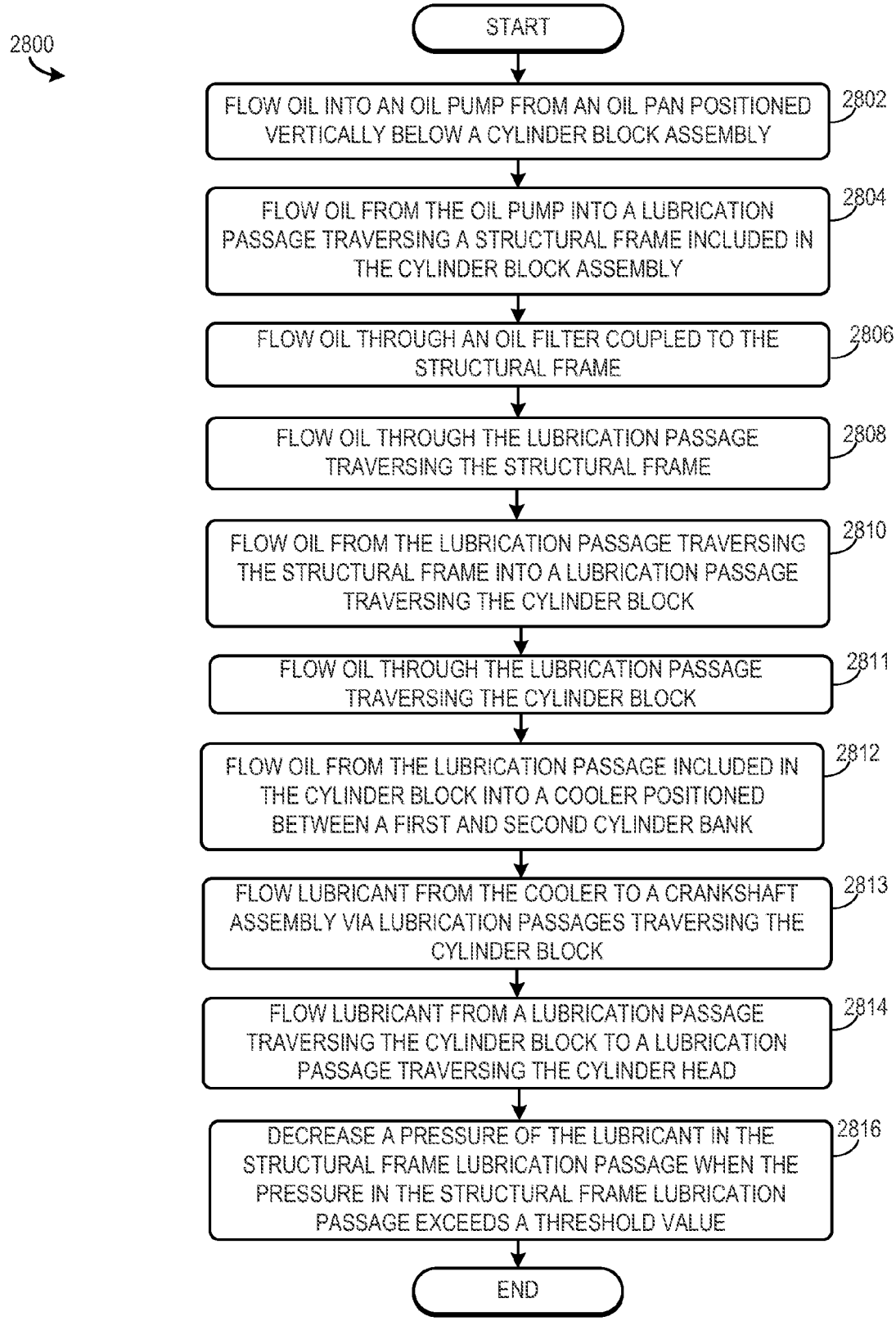

CYLINDER BLOCK ASSEMBLY

CROSS-REFERENCE TO RELATED APPLICATIONS

This application claims priority to U.S. Provisional Patent Application No. 61/428,119, filed Dec. 29, 2010, entitled "CYLINDER BLOCK ASSEMBLY," the entire contents of which are hereby incorporated herein by reference for all purposes.

BACKGROUND/SUMMARY

Internal combustion engine are continually being refined to increase the output of the engine as well as reduce the engine's weight and/or size. Boosting devices, such as turbochargers and superchargers, have been added to engines so that the engines may have output similar to larger displacement engines without the fuel economy and emissions of larger displacement engines. Further, vehicle fuel economy may be improved in vehicles having smaller engines at least in part because smaller engines may weigh less than larger displacement engines. Alternatively, output power of an engine may be substantially increased without adding a significant amount of weight to the engine. Additional techniques for increasing engine power such as direct injection may also be used without significantly increasing the engine's weight.

However, decreasing engine size and/or increasing engine power output can increase stress on the engine components. Such concerns may be particularly present for boosted engines which typically have a high power to weight ratio as compared to naturally aspirated engines. Therefore, some boosted engines are comprised of increased amounts of material, such as aluminum, to reinforce the cylinder block. But, increasing the amount of material used to form the cylinder block can increase engine weight as well as size, thereby undermining the basic objective of increasing the engine's power to weight ratio.

The inventors herein have recognized the challenges of boosting a weight reduced engine and have provided a cylinder block. The cylinder block may include a cylinder and two crankshaft supports at a bottom of the cylinder block. The cylinder block may further include a cylinder head engaging surface at a top of the cylinder block, first and second sidewalls extending from the cylinder head engaging surface to a structural frame engaging surface positioned above a centerline of two crankshaft supports, and a lubrication passage providing fluidic communication between the structural frame engaging surface and the cylinder head engaging surface.

In this way, lubrication passages may be internally routed through the structural frame and the cylinder block. The internal routing of the lubrication passages through both the structural frame and the cylinder block increases the compactness of the engine. Furthermore, external lubricant routing lines may not be needed when the lubrication lines are internally routed through the cylinder block assembly. Therefore, the likelihood of rupturing a lubrication line during engine installation may be reduced and in some cases substantially eliminated when lubrication passages are internally routed through the structural frame. Furthermore, the cost of manufacturing of the cylinder block assembly may be reduced when lubrication passages are internally routed through the cylinder block assembly.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE FIGURES

FIG. 28 shows a method for operation of a lubrication system in an engine.

FIGS. 3-19 and 21-27 are drawn approximately to scale.

DETAILED DESCRIPTION

Figure 1:
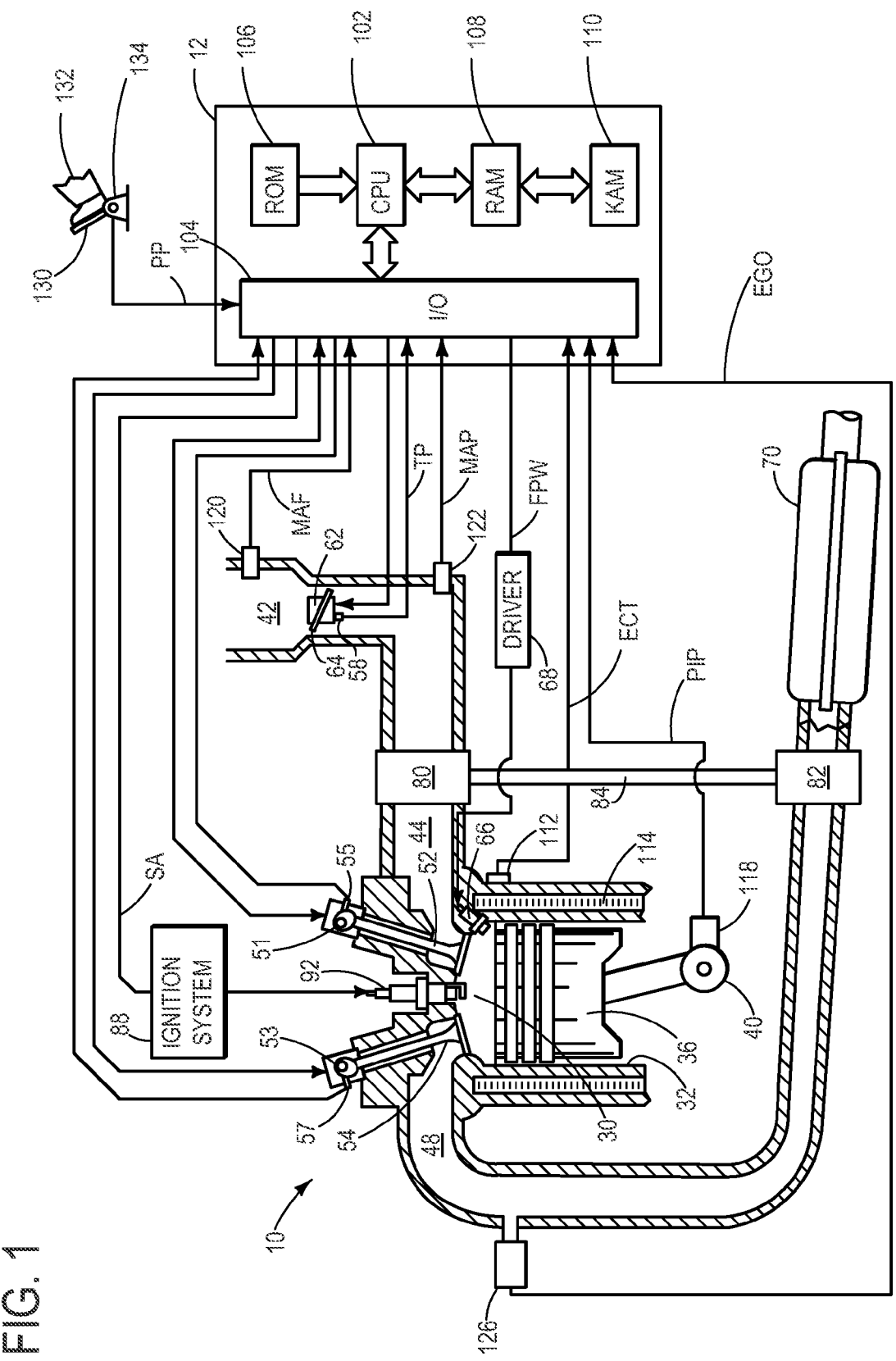
FIG. 1 shows a schematic depiction of an internal combustion engine.

Referring to FIG. 1, internal combustion engine 10, comprising a plurality of cylinders, one cylinder of which is shown in FIG. 1, is controlled by electronic engine controller 12. Engine 10 includes cylinder 30 and cylinder walls 32 with piston 36 positioned therein and connected to crankshaft 40. Cylinder 30 may also be referred to as a combustion chamber. Cylinder 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Intake manifold 44 is also shown intermediate of intake valve 52 and air intake zip tube 42. Fuel is delivered to fuel injector 66 by a fuel system (not shown) including a fuel tank, fuel pump, and fuel rail (not shown). The engine 10 of FIG. 1 is configured such that the fuel is injected directly into the engine cylinder, which is known to those skilled in the art as direct injection. Fuel injector 66 is supplied operating current from driver 68 which responds to controller 12. In addition, intake manifold 44 is shown communicating with optional electronic throttle 62 with throttle plate 64. In one example, a low pressure direct injection system may be used, where fuel pressure can be raised to approximately 20-30 bar. Alternatively, a high pressure, dual stage, fuel system may be used to generate higher fuel pressures. Additionally or alternatively a fuel injector may be positioned upstream of intake valve 52 and configured to inject fuel into the intake manifold, which is known to those skilled in the art as port injection.

Distributorless ignition system 88 provides an ignition spark to cylinder 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, Hall effect sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into cylinder 30 via intake manifold 44, and piston 36 moves to the bottom of the cylinder so as to increase the volume within cylinder 30. The position at which piston 36 is near the bottom of the cylinder and at the end of its stroke (e.g., when cylinder 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within cylinder 30. The point at which piston 36 is at the end of its stroke and closest to the cylinder head (e.g., when cylinder 30 is at its smallest volume) is typically referred to by those of skill in the art as top dead center (TDC). In a process hereinafter referred to as injection, fuel is introduced into the cylinder. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Engine 10 may further include a turbocharger having a compressor 80 positioned in intake manifold 44 coupled to a turbine 82 positioned in exhaust manifold 48. A driveshaft 84 may couple the compressor to the turbine. Thus, the turbocharger may include compressor 80, turbine 82, and driveshaft 84. Exhaust gases may be directed through the turbine, driving a rotor assembly which in turn rotates the driveshaft. In turn the driveshaft rotates an impeller included in the compressor configured to increase the density of the air delivered to cylinder 30. In this way, the power output of the engine may be increased. In other examples, the compressor may be mechanically driven and turbine 82 may not be included in the engine. Further, in other examples, engine 10 may be naturally aspirated.

Figure 2:
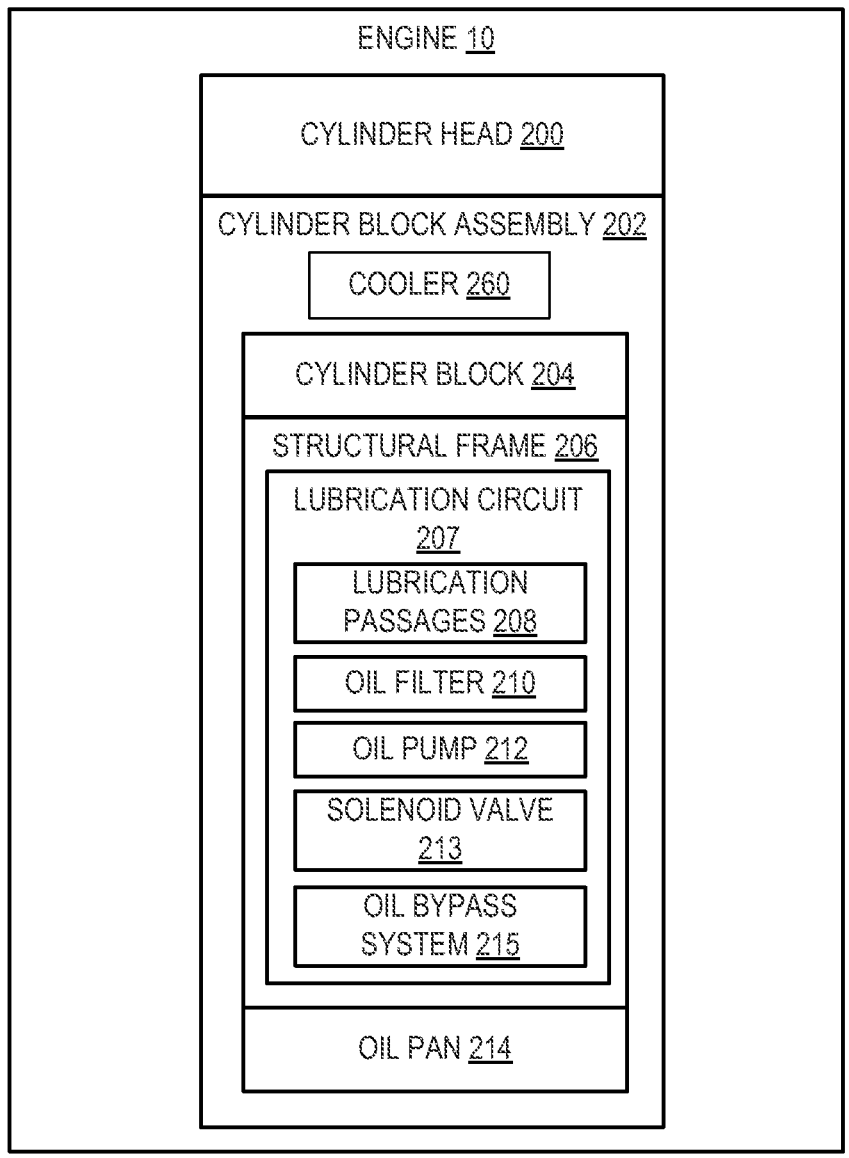
FIG. 2 shows another schematic depiction of the internal combustion engine shown in FIG. 1 including a cylinder block assembly.

Referring to FIG. 2, it shows an example schematic depiction of engine 10. Engine 10 includes a cylinder head 200 coupled to a cylinder block assembly 202. It will be appreciated that the engine may further include various components for attaching the cylinder head to the cylinder block assembly such as a head gasket (not shown), bolts or other suitable attachment apparatuses, etc.

The cylinder head and cylinder block assembly may each comprise at least one cylinder. As discussed above with regard to FIG. 1, engine 10 may include additional components configured to perform combustion in the at least one cylinder.

The cylinder block assembly may include a cylinder block 204 coupled to a structural frame 206. The structural frame may include a lubrication circuit 207 integrated therein. The lubrication circuit may include lubrication passages 208 (e.g., oil passages), oil filter 210, oil pump 212, and solenoid valve 213. The lubrication passages may be configured to provide lubrication to various engine components such as the crankshaft and crankshaft bearings. The oil filter may be coupled to a lubrication passage and configured to remove unwanted particulates from the lubrication passage. Moreover, the oil pump may also be coupled to a lubrication passage included in lubrication passages 208 and configured to increase the pressure in the lubrication circuit 207. It will be appreciated that additional integrated components may be included in structural frame 206. For example, the integrated components may include balance shafts, block heaters, actuators, and sensors.

In one example, an oil pan 214 may be coupled to structural frame 206. The oil pan may be included in a lubrication circuit. Oil pump 212 may also be coupled to structural frame 206 via bolts or other suitable fasteners. Oil pump 212 may be configured to circulate oil from oil pan 214 into lubrication passages 208. Various lubrication passages are shown in FIGS. 20-27 described in greater detail herein. Thus, the oil pump may include a pick-up disposed in the oil pan as discussed in greater detail herein with regard to FIG. 3. It will be appreciated that lubrication passages 208 may be fluidly coupled to lubrication passages included in cylinder head 200.

Engine 10 may further include a cooler 260 integrated into cylinder block assembly 202. Cooler 260 may be configured to remove heat from lubrication circuit 207. Cooler 260 may be an oil cooler.

Figure 3:
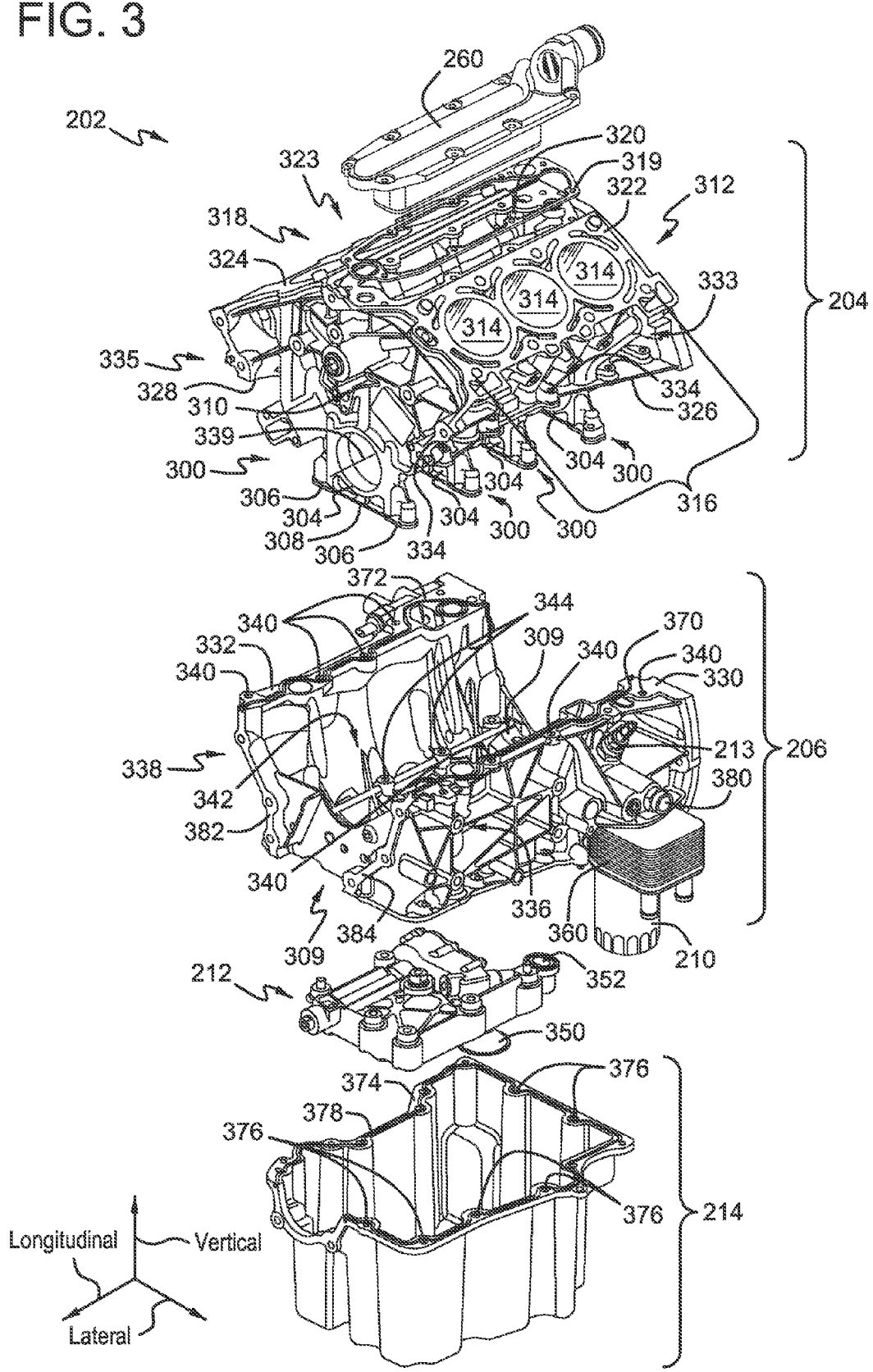
FIG. 3 shows an exploded perspective view of an example cylinder block assembly.

Referring to FIG. 3, it shows an exploded perspective view of an example cylinder block assembly 202. As depicted, cylinder block assembly 202 includes cylinder block 204 positioned vertically above the structural frame 206. Pump 212 and oil pan 214 are positioned vertically below the structural frame 206. Directional vectors (i.e., the longitudinal, vertical, and lateral vectors) are provided for conceptual understanding. However, it will be appreciated that the cylinder block assembly may be positioned in a number of orientations when included in a vehicle.

The cylinder block 204 further includes a plurality of crankshaft supports 300 positioned at the bottom of the cylinder block 204 and configured to structurally support a crankshaft (not shown). In some examples, the cylinder block may include two crankshaft supports. The crankshaft supports 300 may each include a bearing cap 304. The bearing caps are configured to receive a crankshaft bearing. Thus, the crankshaft supports form openings that are configured to receive crankshaft bearing (not shown) configured to enable rotation of a crankshaft (not shown). It will be appreciated that the crankshaft may include various components such as counterweights, journals, crankpin journals, etc. The crankpin journals may each be coupled to a piston via a connecting rod. In this way, combustion in the cylinders may be used to rotate the crankshaft.

Figure 19:
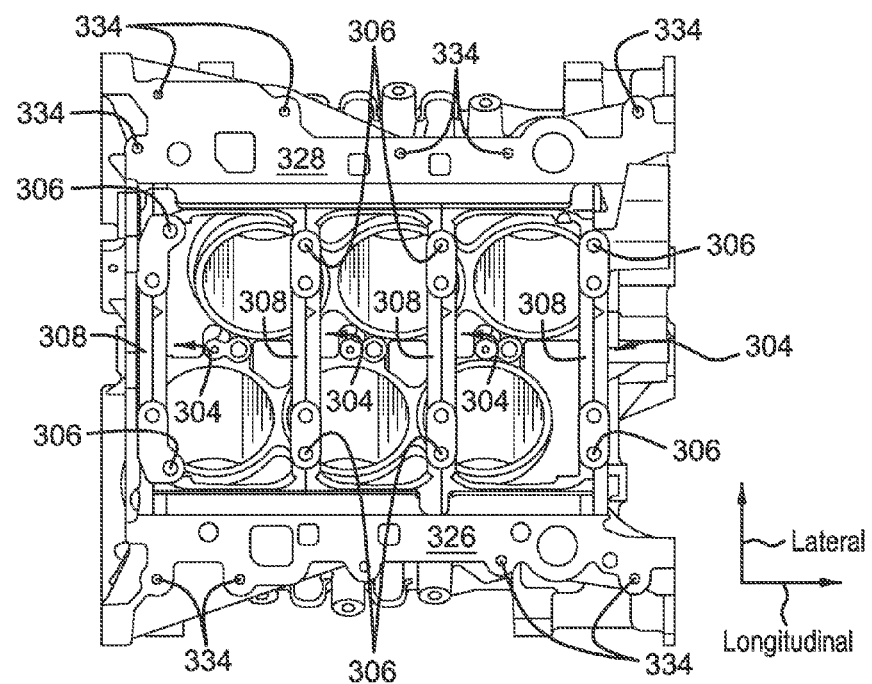
FIG. 19 show a bottom view of the cylinder block shown in FIG. 3.

The bearing caps 304 may each include two structural frame attachment recesses 306, shown in greater detail in FIG. 19. The structural frame attachment recesses may be configured to receive a fastener such as a bolt or other suitable attachment apparatus for coupling the structural frame 206 to the cylinder block 204, discussed in greater detail herein with regard to FIG. 4. In this way, the structural frame 206 is coupled to the cylinder block 204 via the bearing caps 304. As shown, each structural frame attachment recess 306 extends vertically into the crankshaft supports 300 from a bottom surface 308 of each the bearing caps. Moreover, each structural frame attachment recess is positioned on the lateral periphery of the bottom surface 308. However in other examples, the structural frame attachment recesses may be positioned in another suitable location. Still further, in some examples the structural frame attachment recesses may have an alternate geometric configuration and/or orientation.

As shown, crankshaft supports 300 are formed out of one continuous piece of material. In other words, the crankshaft supports 300 are manufactured via a single casting. Further in the depicted example, the cylinder block 204 is a one piece engine cylinder block constructed in a single casting. The crankshaft supports may be cracked or otherwise divided from the cylinder block 204 after casting so that a crankshaft (not shown) may be installed. After the crankshaft is properly positioned, the pieces of the crankshaft supports may be subsequently fastened to the cylinder block after being divided from the cylinder block. In this way, the structural integrity as well as the precision of the mated interface of the crankshaft supports may be increased when compared to other cylinder block designs which may couple separately constructed (e.g., cast) upper and lower pieces of the cylinder block to form the bearing cap. Moreover, NVH may also be reduced in the cylinder block assembly when the crankshaft supports are constructed out of a single piece of material.

Cylinder block 204 further includes an exterior front wall 310. The exterior front wall 310 is shown in greater detail in FIG. 11. Likewise, cylinder block 204 further includes an exterior rear wall 312, show in FIG. 6. The exterior front wall 310 includes a first outermost crankshaft support 1100. However, in the example in which the cylinder block comprises two crankshaft supports, the exterior front wall includes a first crankshaft support. The exterior rear wall 312 includes a second outermost crankshaft support 600, discussed in greater detail herein with regard to FIG. 6.

Continuing with FIG. 3, as depicted the cylinder block 204 includes a plurality of cylinders 314. However, in other examples the cylinder block 204 may include a single cylinder. It will be appreciated that cylinder 30 shown in FIG. 1 may be included in the plurality of cylinders 314. The plurality of cylinders 314 may be conceptually divided into a first and a second cylinder bank (316 and 318). Cylinder bank 318 is shown in greater detail herein with regard to FIG. 18. As shown, the engine may be in a V configuration in which opposing cylinders in each of the respective cylinder banks are positioned at a non-straight angle with respect to one another. In this way, the cylinders are arranged in a V. However, other cylinder configurations are possible in other examples. A valley 320 may be positioned between the first and second cylinder banks (316 and 318) in the cylinder block 204. Cooler 260 may be positioned in the valley when the cylinder block assembly 202 is assembled. A gasket 319 may be positioned between the oil cooler 260 and the cylinder block 204.

Cylinder block 204 further includes a first cylinder head engaging surface 322 positioned at a top 323 of the cylinder block. Additionally in the depicted example, the cylinder block includes a second cylinder head engaging surface 324. However in other examples, the cylinder block may include a single cylinder head engaging surface. The first and second cylinder head engaging surface (322 and 324) may be configured to couple to cylinder head 200 shown in FIG. 2. Suitable attachment apparatuses, such as bolts, may be used to couple the cylinder head 200 to the cylinder block 204 in some examples. When assembled the cylinder head 200, shown in FIG. 2, and the cylinder block 204 are attached, combustion chambers may be formed in which combustion may be implemented as previously discussed with regard to FIG. 1. Suitable attachment apparatuses (not shown) may be used to couple the cylinder head 200, shown in FIG. 2, to the cylinder block 204. Additionally, a seal (e.g., gasket) may be positioned between cylinder head 200 and the first and second cylinder head engaging surfaces (322 and 324) to seal the cylinders.

Cylinder block 204 further includes two structural frame engaging surfaces (326 and 328) configured to attach to two corresponding cylinder block sidewall engaging surfaces (330 and 332) included in the structural frame 206 discussed in greater detail herein. The two structural frame engaging surfaces (326 and 328) are positioned on opposing sides of the cylinder block 204. In the perspective view of the cylinder block assembly 202 shown in FIG. 3, the second structural frame engaging surface 328 cannot be fully viewed. However, the second structural frame engaging surface 328 as well as other components included in the other side of the cylinder block are shown in greater detail in FIG. 19. As depicted, the structural frame engaging surfaces (326 and 328) include a plurality of fastener openings 334. The fastener openings 334 may be configured to receive fasteners such as bolts when coupled to the structural frame 206 discussed in greater detail herein with regard to FIG. 4.

Cylinder block 204 further includes a first exterior sidewall 333 and a second exterior sidewall 335. The first cylinder block exterior sidewall 333 is shown in greater detail in FIG. 15. Likewise, the second cylinder block exterior sidewall 335 is shown in greater detail in FIG. 16. The first cylinder block exterior sidewall 333 extends from the first cylinder head engaging surface 322 to the first structural frame engaging surface 326 positioned between a centerline 339 of the plurality of crankshaft supports 300. Likewise, the second cylinder block exterior sidewall 335 extends from the second cylinder head engaging surface 324 to the second structural frame engaging surface 328 positioned between the centerline 339 of the plurality of crankshaft supports 300. As shown, the structural frame engaging surfaces (326 and 328) are substantially planar. However, in other examples, the structural frame engaging surface may have another geometric configuration. For example, the height of the structural frame engaging surfaces may vary.

Furthermore, the structural frame 206 includes a bottom surface 309 and two exterior sidewalls (i.e., a first structural frame exterior sidewall 336 and a second structural frame exterior sidewall 338). In some examples, the oil pan engaging surface 506, shown in FIG. 5 may be the bottom surface 309 of the structural frame 206. However, in other examples, the bottom surface 309 may include additional components. The first structural frame exterior sidewall 336 extends from the bottom surface 309 and includes the first cylinder block sidewall engaging surface 330. Likewise, the second structural frame exterior sidewall 338 extends from the bottom surface 309 and includes the second cylinder block sidewall engaging surface 332. Furthermore, the first and second structural frame exterior sidewalls (336 and 338) extend above a top of the crankshaft supports 300 when the cylinder block assembly 202 is assembled. Additionally, the bottom surface 309 is below the crankshaft supports 300. However, in other examples other configurations are possible. For example, the first and second structural frame exterior sidewalls (336 and 338) may not extend above a top of the crankshaft supports. As depicted, the structural frame has a U shape. However, in other examples, other shapes are possible. The cylinder block sidewall engaging surfaces (330 and 332) are configured to attach to the structural frame engaging surfaces (326 and 328) on the cylinder block 204 and are positioned on opposite sides of the structural frame 206. In the depicted example, the cylinder block sidewall engaging surfaces (330 and 332) form top surfaces of the structural frame. However, in other examples, other configurations are possible. The cylinder block sidewall engaging surfaces (330 and 332) include a plurality of fastener openings 340 along their lengths. As shown, the cylinder block sidewall engaging surfaces (330 and 332) are substantially planar and congruent a lateral and longitudinal plane. However, in other examples, alternate geometric configurations and orientations are possible. For example, the vertical height of the sidewall engaging surfaces may vary.

The structural frame may further include a front cover engaging surfaces (382 and 384) extending along at least a portion of the structural frame exterior sidewalls (336 and 338). A first seal 370 may be positioned between the first cylinder block sidewall engaging surface 330 and the first structural frame engaging surface 326. Likewise, a second seal 372 may be positioned between the second cylinder block sidewall engaging surface 332 and the second structural frame engaging surface 328. The first and second seals (370 and 372) may be substantially air and liquid tight. Exemplary seals include but are not limited to a gasket, an adhesive, etc.

The structural frame 206 includes an interior portion 342 adjacent to the crankshaft supports 300 when the cylinder block assembly 202 is assembled. The interior portion 342 includes fastener openings 344 configured to receive suitable fasteners such as bolts. As discussed in greater detail herein, the fasteners may extend through the fastener openings 344 in the structural frame 206 as well as the attachment recesses 306 in the cylinder block 204. The interior portion 342 is described in greater detail herein with regard to FIG. 17.

In some examples, cylinder block 204 and structural frame 206 may be constructed out of different materials. Specifically in one example, cylinder block 204 may be constructed out of a material having a greater strength to volume ratio than structural frame 206. However, in other examples, the cylinder block and structural frame may be constructed out of substantially identical materials. Exemplary materials that may be used to construct the cylinder block include a gray iron, compacted graphite iron, ductile iron, aluminum, magnesium, and/or plastic. Exemplary materials used to construct the structural frame include gray iron, compacted graphite iron, ductile iron, aluminum, magnesium, and/or plastic. In one particular example, the cylinder block may be constructed out of a compacted graphite iron and the structural frame may be constructed out of aluminum. In this way, increased structural integrity may be provided to locations in the cylinder block assembly that experience greater stress, such as the combustion chambers and surrounding areas. Moreover, the volumetric size of the cylinder block assembly may be reduced when the aforementioned combination of materials is utilized in the cylinder block assembly as opposed to a cylinder block constructed only out of aluminum. Still further, the structural frame may be constructed out of a material having a greater strength to weight ratio than the material used to construct the cylinder block, thereby enabling weight reduction of the cylinder block assembly 202.

The cylinder block assembly further includes oil pan 214 positioned vertically below the structural frame 206 and cylinder block 204. When assembled oil pump 212 may be coupled to an oil pan engaging surface 506, shown in FIG. 5, located on a bottom side of the structural frame. Moreover, the oil pump includes pick-up 350 positioned in the oil pan when the cylinder block assembly is assembled and an outlet port 352 configured to deliver oil to a lubrication passage 550, shown in FIG. 5, in the structural frame 206. In this way, the oil pump 212 may receive oil from the oil pan 214. The cylinder block assembly 202 further includes oil filter 210 and an oil filter port 550 for receiving the oil filter 210. The oil filter may be coupled to a plate body cooler 360. In this way, the oil filter includes an oil cooler. Plate body cooler 360 cools engine oil as it is circulated throughout the engine.

The cylinder block assembly 202 further includes oil pan 214. The oil pan includes a third structural frame engaging surface 374 having fastener openings 376 for receiving fasteners. A seal 378 may be positioned between the third structural frame engaging surface 374 and an oil pan engaging surface 506 included in the structural frame shown in FIG. 5, discussed in greater detail herein.

The structural frame 206 further includes a sensor mounting boss 380 for receiving a sensor, such as an oil pressure sensor. As shown, the sensor mounting boss 380 is positioned on the first structural frame exterior sidewall 336. However, the sensor mounting boss may be positioned in another suitable location such as on the second structural frame exterior sidewall 338 in other examples.

Figure 4:
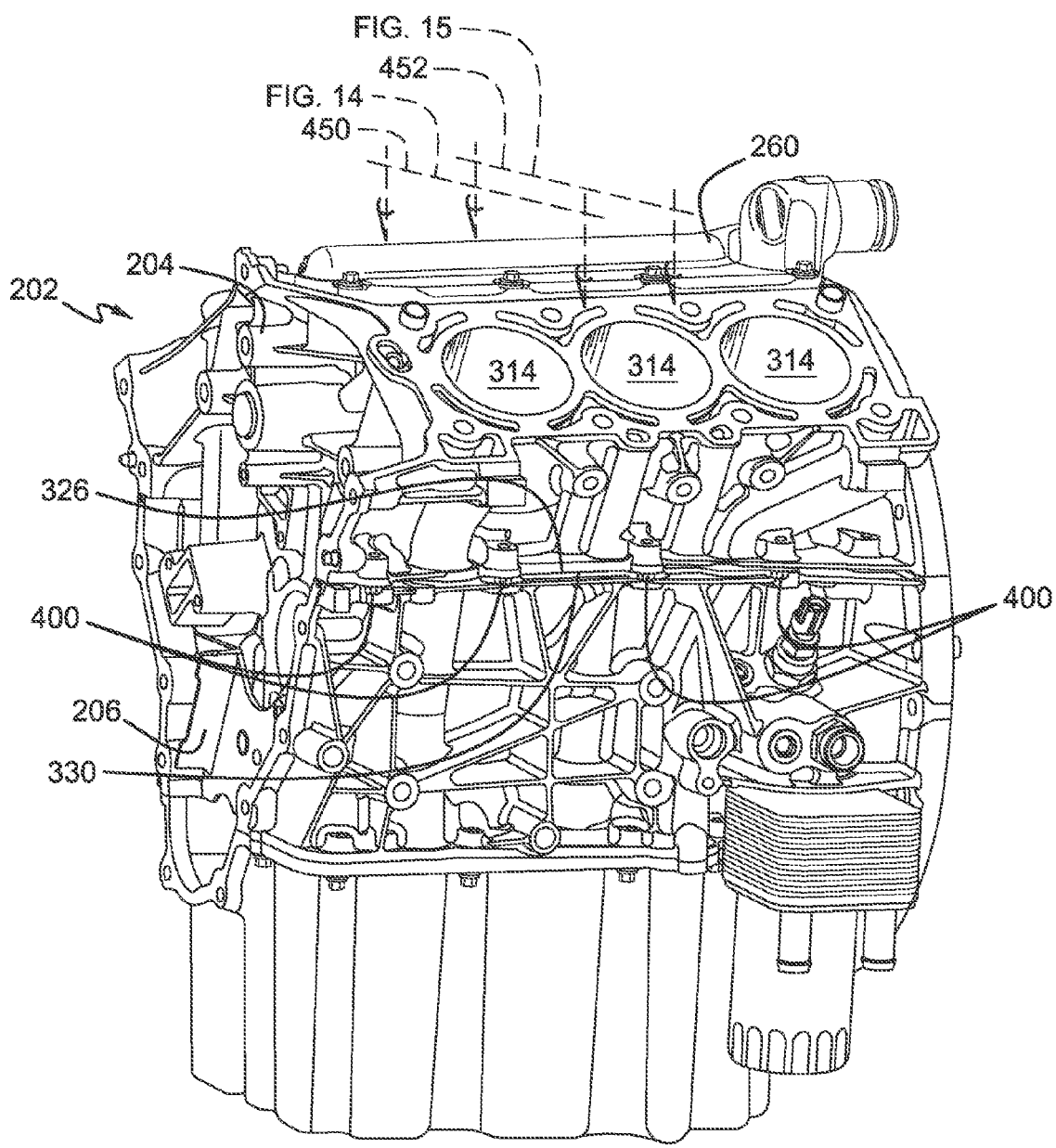
FIG. 4 shows an assembled view of the cylinder block assembly shown in FIG. 3.

FIG. 4 shows another perspective view of the cylinder block assembly 202 in an assembled configuration. As shown, the cylinder block 204 is attached to the structural frame 206. As shown, the first and second cylinder block sidewall engaging surface (330 and 332) on the structural frame 206 may be coupled to corresponding structural frame engaging surfaces (326 and 328). It will be appreciated that the structural frame engaging surfaces and cylinder block sidewall engaging surfaces may be corresponding contoured to attach to on another such that the surfaces are in face sharing contact. However, in some examples seals may be positioned between the engaging surfaces as previously discussed.

Fasteners 400 extend through fastener openings (334 and 340) in both of the structural frame engaging surfaces (326 and 328) and the cylinder block sidewall engaging surfaces (330 and 332). In this way, the engaging surfaces may be secured to one another. Although FIG. 4 shows a single side of the cylinder block assembly 202 in which the engaging surfaces are attached it will be appreciated that engaging surfaces on the opposing side of the cylinder block assembly may also be coupled. Cutting planes (450, 452, 454, 456, 458, and 460) define the cross-sections shown in FIGS. 21-27, respectively.

Figure 5:
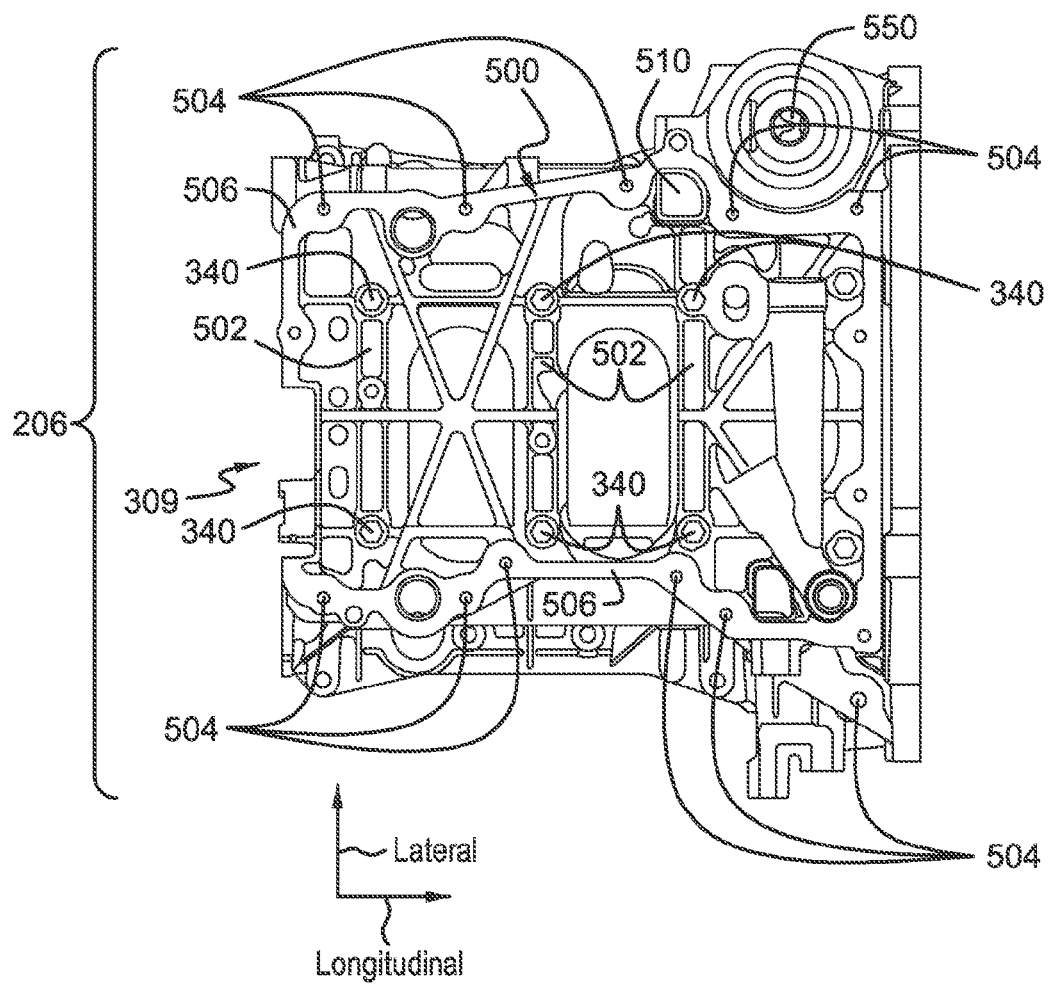
FIG. 5 shows a bottom view of a structural frame included in the cylinder block assembly shown in FIG. 3.

FIG. 5 shows the exterior portion 500 of the bottom surface 309 of the structural frame 206. As shown, the fastener openings 340 extend from the interior portion 342 of the structural frame 206, shown in FIG. 3, to the exterior portion 500 of the structural frame 206, thereby forming openings. As previously discussed fasteners such as bolts may extend through the fastener openings 340 when the cylinder block assembly is in an assembled configuration. In the depicted example, the structural frame 206 has a ladder configuration. In the ladder configuration the structural frame 206 includes supports 502 that are laterally aligned. When the structural frame 206 has a ladder configuration it may be referred to as a ladder frame. Specifically in the ladder configuration, the supports 502 are aligned with the crankshaft supports 300, shown in FIG. 3, when the cylinder block assembly 202 is assembly, thereby providing structural support to the cylinder block 204 and crankshaft. It will be appreciated that when the cylinder block 204 is attached to the structural frame 206 in this way, the structural integrity of the cylinder block assembly may be increased and the NVH during engine operation may be reduced. However, other support alignments are possible in other examples or the supports may not be included in the structural frame. An oil pan engaging surface 506 is also shown in FIG. 5. The oil pan engaging surface includes fastener opening 504 configured to receive fasteners when attached to the oil pan 214. The structural frame 206 further includes an inlet 510 to lubrication passage 2000, shown in FIG. 20, configured to receive oil from the outlet port 352 of the oil pump 212. It will be appreciated that the oil pump 212 may be coupled to the oil pan engaging surface 506 when the cylinder block assembly 202 is assembled. Structural frame 206 also includes oil filter port 550 for supplying and receiving oil from oil filter 210.

Figure 6:
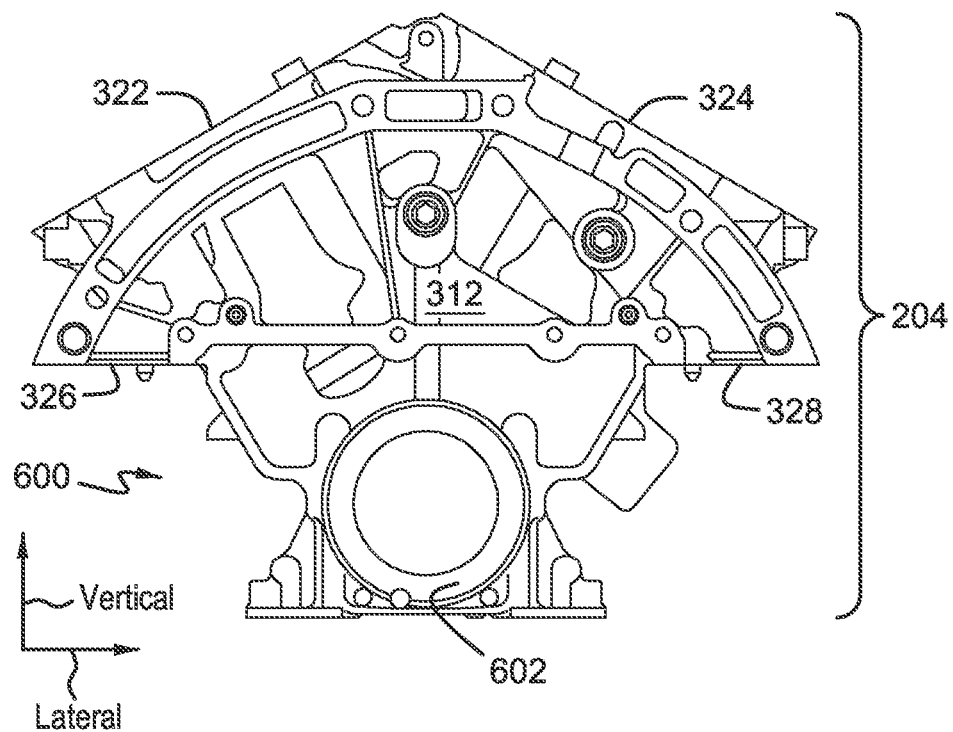
FIG. 6 shows a rear end view of the cylinder block shown in FIG. 3.
Figure 7:
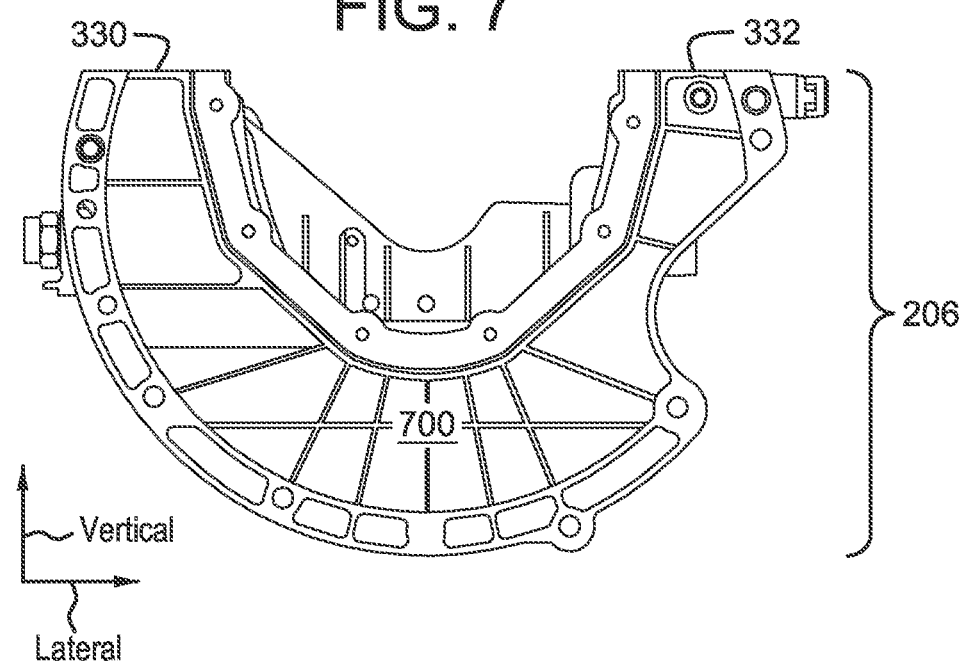
FIG. 7 shows a rear end view of the structural frame shown in FIG. 3.

FIG. 6 shows the exterior rear wall 312 of the cylinder block 204 including an outermost crankshaft support 600 and corresponding bearing cap 602. The cylinder head engaging surfaces (322 and 324) and the first and second structural frame engaging surfaces (326 and 328) are also shown in FIG. 6. Similarly, FIG. 7 shows a rear end 700 of the structural frame 206. The first and second cylinder block sidewall engaging surfaces (330 and 332) are also depicted in FIG. 7.

Figure 8:
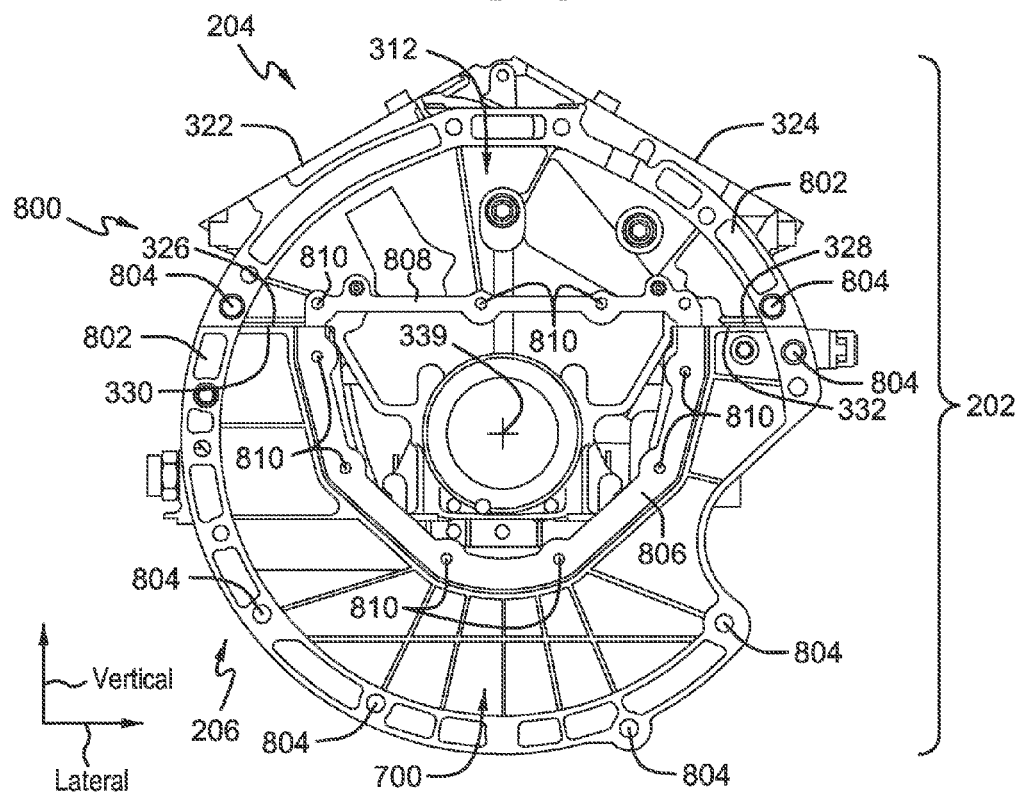
FIG. 8 shows a rear end view of the cylinder block assembly shown in FIG. 4.

FIG. 8 shows a view of the rear portion 800 of the cylinder block assembly 202 including the rear wall 312 of the cylinder block 204 and the rear end 700 of the structural frame 206 in an assembled configuration. As shown, the structural frame 206 may be coupled to the exterior rear wall 312 of the cylinder block 204. As shown, the rear end 700 of the structural frame 206 and the rear wall 312 provide a transmission bell housing engaging surface 802. The transmission bell housing engaging surface 802 may be coupled to a transmission bell housing (not shown). In this way, the transmission may be attached to the cylinder block assembly 202. Furthermore, the structural frame 206 isolates at least a portion of an interior of the engine 10 from the transmission (not shown). As shown, the transmission bell housing engaging surface is positioned near the periphery of the rear end of the cylinder block assembly 202. However, in other examples the transmission bell housing engaging surface may be positioned in another suitable location. A plurality of connection recesses 804 are included in the transmission bell housing engaging surface 802. The connection recesses may be configured to receive fasteners for connecting the transmission bell housing to the cylinder block assembly 202. Further, the connection recesses 804 are shown extending a full 360° around the centerline 339 of the crankshaft supports. It will be appreciated that in FIG. 8 the centerline 339 extends into and out of the page. As such, the rear portion of the cylinder block assembly 202 is arranged in a circular shape. The cylinder block 204 forms a top portion of the circle, and structural frame 206 forms a bottom portion of the circle. Thus, cylinder block 204 and structural frame 206 provide at least a portion of the support keeping the transmission bell housing in place when the transmission bell housing is coupled to cylinder block assembly 202. In this way, the connection between the transmission and the cylinder block assembly may be strengthened thereby reducing NVH within the vehicle.

Furthermore, the structural frame 206 may include a rear cover engaging surface 806 for a rear main crankshaft seal housing. Likewise, the cylinder block 204 may include a rear cover engaging surface 808 for the rear main crankshaft seal housing. In this way, the crankshaft may be substantially sealed. Both the engaging surfaced 806 and 808 may include fastener openings 810 for receiving fasteners.

FIG. 8 also shows the cylinder head engaging surfaces (322 and 324), the first structural frame engaging surface 326 attached to the first cylinder block sidewall engaging surface 330, and the second structural frame engaging surface 328 attached to the second cylinder block sidewall engaging surface 332.

Figure 9:
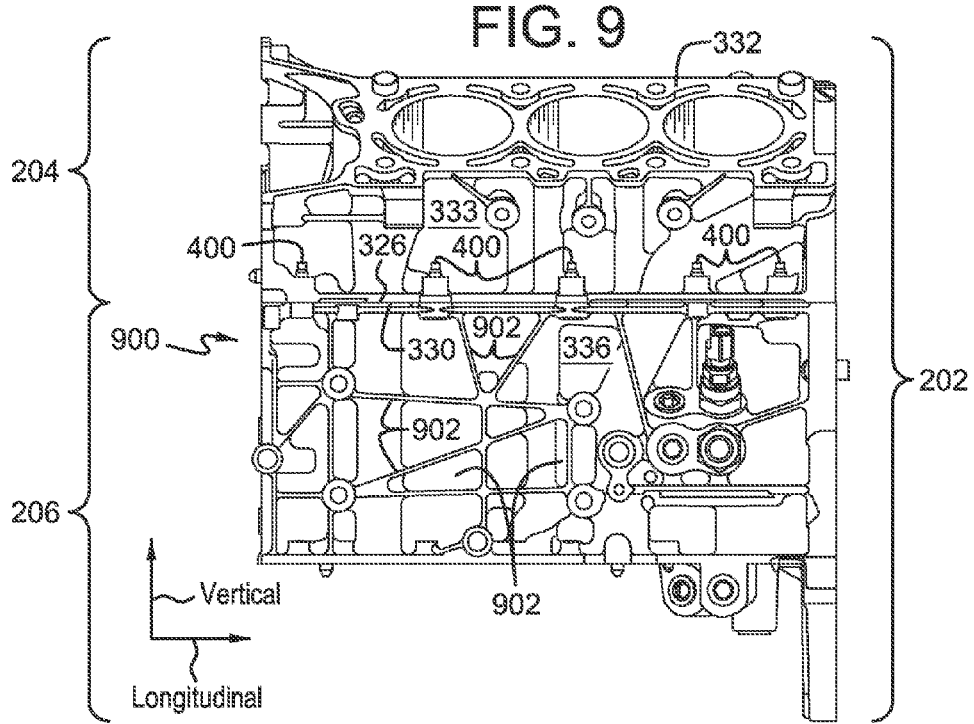
FIG. 9 shows a left side view of the cylinder block assembly shown in FIG. 4.
Figure 10:
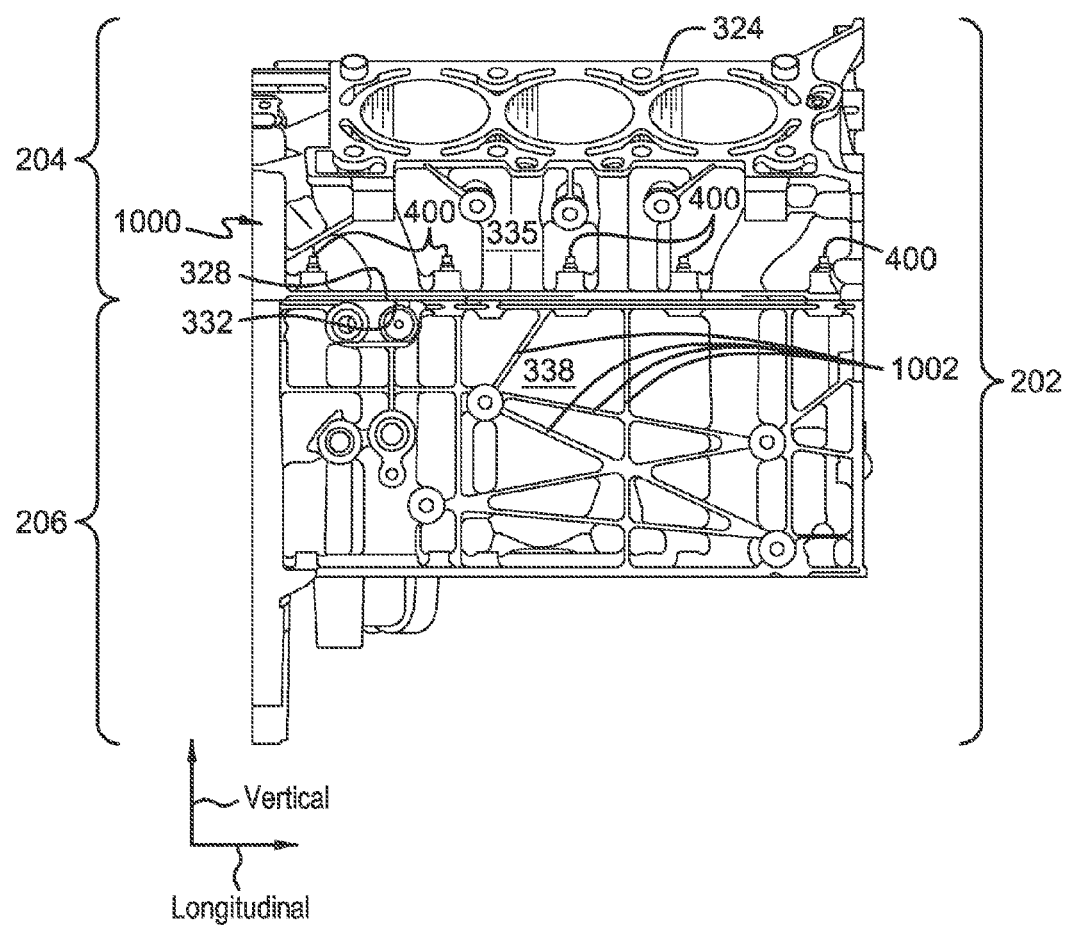
FIG. 10 shows a right side view of the cylinder block assembly shown in FIG. 4.

FIGS. 9 and 10 show side views of the laterally opposing sidewalls of the cylinder block assembly 202. Specifically FIG. 9 shows a first assembly sidewall 900 of the cylinder block assembly 202 and FIG. 10 shows a second assembly sidewall 1000 of the cylinder block assembly 202. As shown, a portion of the cylinder block 204 and the structural frame 206 included in the cylinder block assembly 202 form the assembly sidewalls (900 and 1000). Specifically, the first assembly sidewall 900 includes the first cylinder block exterior sidewall 333 and the first structural frame exterior sidewall 336. Furthermore, the first structural frame exterior sidewall 336 included in the sidewall 900 includes stiffening webbing 902. Moreover, in the depicted example, the first structural frame exterior sidewall 336 provides more than half a vertical length of the first assembly sidewall 900. However in other examples, other configurations are possible. Likewise, as shown in FIG. 10, the second assembly sidewall 1000 includes the cylinder block second exterior sidewall 335 and the structural frame second exterior sidewall 338. Additionally, the structural frame second exterior sidewall 338 included in the second assembly sidewall 1000 includes stiffening webbing 1002. The stiffening webbing strengthens the walls without having to increase the wall strength throughout cylinder block assembly 202 and specifically the structural frame 206. As such, stiffening webbing (902 and 1002) strengthens the structural frame 206 of the cylinder block assembly 202 without adding significant weight to the structural frame 206. Further in the depicted example, the structural frame second exterior sidewall 338 provides more than half a vertical length of the second assembly sidewall 1000. However in other examples, other configurations are possible.

FIG. 9 also shows the first structural frame engaging surface 326 coupled to the first cylinder block sidewall engaging surface 330. As shown, fasteners 400 may extend through the first structural frame engaging surface and the first cylinder block sidewall engaging surface to attach the cylinder block 204 to the structural frame 206. Cylinder head engaging surface 322 is also depicted in FIG. 9.

FIG. 10 also shows the second structural frame engaging surface 328 coupled to the second cylinder block sidewall engaging surface 332. As shown, fasteners 400 may extend through the second structural frame engaging surface and the second cylinder block sidewall engaging surface to attach the cylinder block 204 to the structural frame 206.

Figure 11:
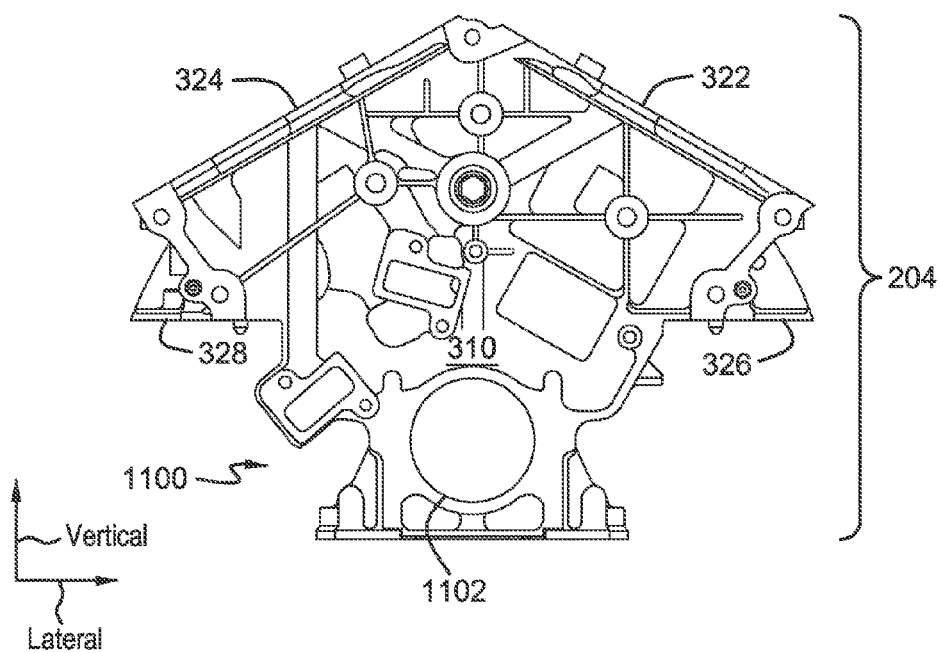
FIG. 11 shows front end view of the cylinder block shown in FIG. 3.
Figure 12:
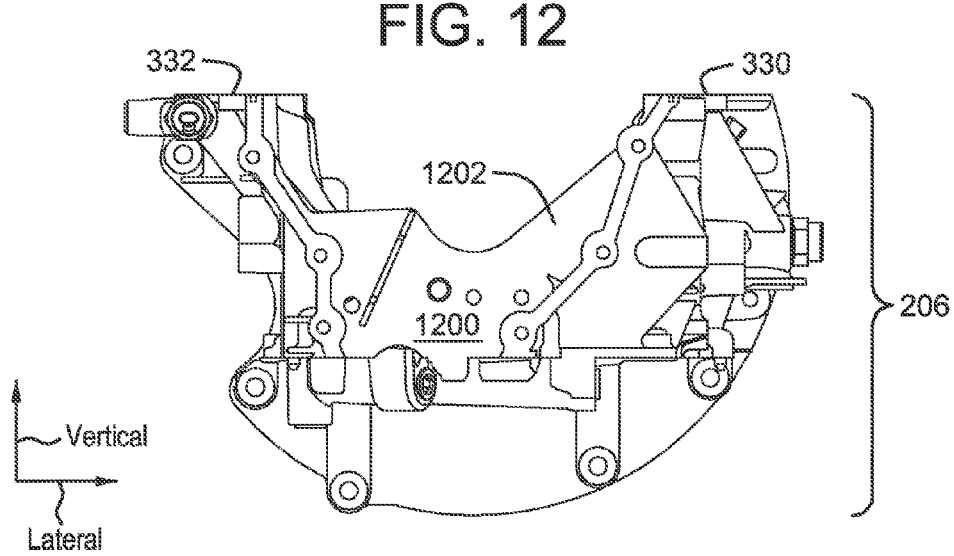
FIG. 12 shows front end view of the structural frame shown in FIG. 3.

FIG. 11 shows a view of the exterior front wall 310 of the cylinder block 204. As previously discussed, the exterior front wall 310 includes an outermost crankshaft support 1100 and corresponding bearing cap 1102. The cylinder head engaging surfaces (322 and 324) and the first and second structural frame engaging surface (326 and 328) are also shown in FIG. 11. FIG. 12 shows a detailed front side 1200 of the structural frame 206. The front side 1200 of the structural frame 206 may include a front partition 1202. As shown, the front partition 1202 couples the first and second structural frame exterior side walls (336 and 338). The cylinder head engaging surfaces (322 and 324) and the first and second cylinder block sidewall engaging surfaces (330 and 332) are also shown in FIG. 12.

Figure 13:
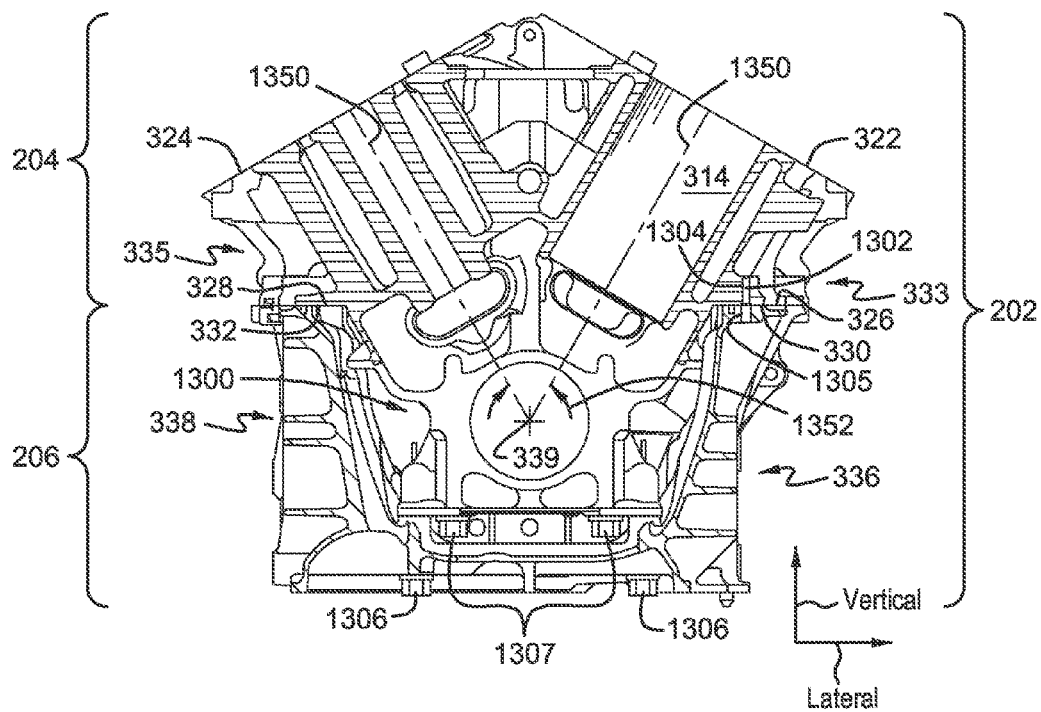
FIGS. 13 and 14 show cut-away views of the cylinder block assembly shown in FIG. 4.

Referring to FIG. 13, it shows a cut-away view of the cylinder block assembly 202. Cutting plane 450, shown in FIG. 4, defines the cross-section shown in FIG. 13. One crankshaft support 1300 included in the plurality of crankshaft supports 300 is shown. The centerline 339 extends into and out of the page. As shown, a fastener 1302 included in the plurality of fasteners 400, shown in FIG. 4, extends through the fastener opening 1304 included in the plurality of fastener openings 334, shown in FIG. 3, in the first structural frame engaging surface 326 and fastener opening 1305 included in the plurality of fastener openings 340, shown in FIG. 3, in the first cylinder block sidewall engaging surface 330. The fastener 1302 as well as the other fasteners 400, shown in FIG. 4, couple the structural frame 206 to the cylinder block 204 vertically above the centerline 239 of the crankshaft relative to the bottom of the cylinder block 204 and the structural frame 206. In this way, the first and second structural frame exterior sidewalls (336 and 338) of the structural frame 206 extend above the centerline 339 of the crankshaft supports 300. Therefore, the first and second cylinder block exterior sidewalls (333 and 335) end above the centerline 339 of the crankshaft supports 300. Likewise, the first and second structural frame exterior sidewalls (336 and 338) end above the centerline 339 of the crankshaft supports 300.

When the cylinder block is coupled to the structural frame above the centerline of the crankshaft supports, the cylinder block assembly may be provided with increased structural integrity when compared to other cylinder block designs that connect the cylinder block to the frame vertically at or below the centerline of the crankshaft supports. Moreover, NVH may be decreased within the engine when this type of configuration is utilized due to the increased structural integrity of the cylinder block assembly. Further, extending the first and second structural frame exterior sidewalls (336 and 338) above the centerline 339 of the crankshaft supports allows the structural frame 206 to be constructed of a lower strength to volume material so that engine weight may be reduced.

Additionally, fasteners 1306 may extend through a fastener opening included in the plurality of fastener openings 344, shown in FIG. 3. In this way, the structural frame 206 may be coupled to the cylinder block in another location, further increasing the reinforcement provided by the structural frame 206. FIG. 13 also shows the centerlines 1350 of the cylinders are positioned at a non-straight angle 1352 with respect to one another. However, in other examples other cylinder arrangements are possible. Fasteners 1307 may be used to attach a lower portion of the crankshaft support 1300 to an upper portion of the crankshaft support 1300 after it is cracked or otherwise divided. However, in other embodiments the cylinder block assembly 202 may not include fasteners 1307. Example fasteners include bolts, screws, or other suitable attachment apparatuses.

The second cylinder block sidewall engaging surface 332 and the second structural frame engaging surface 328 are also shown in FIG. 13. It will be appreciated that the second cylinder block sidewall engaging surface and the second structural frame engaging surface may include similar fasteners and fastener opening to fastener 1302 and fastener opening 1304 and 1305 shown in FIG. 13.

Figure 14:
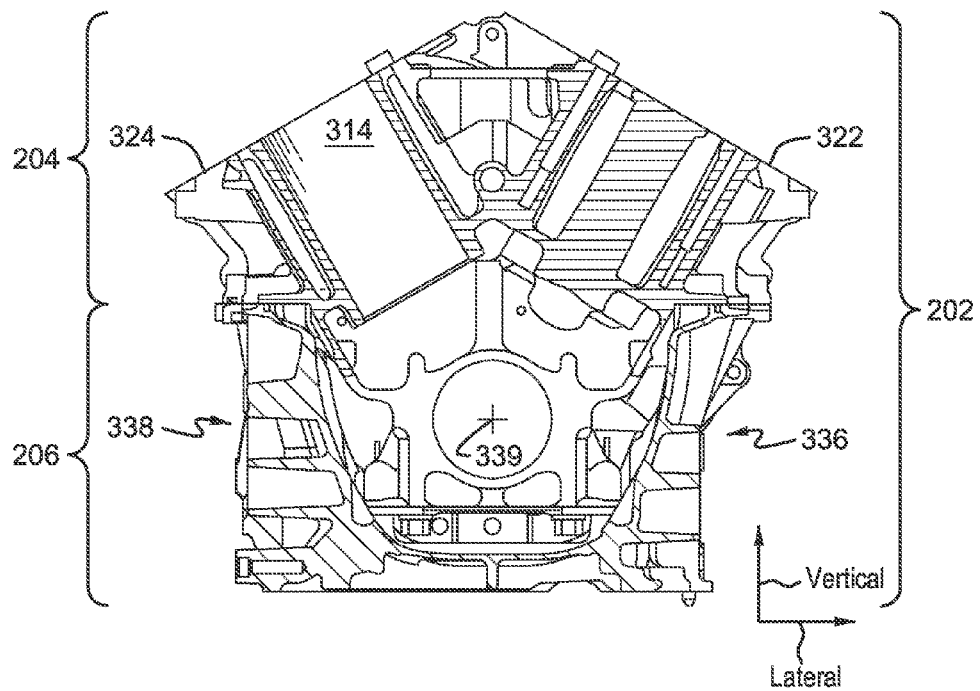

Referring to FIG. 14, it shows another cut-away view of cylinder block assembly 202. Cutting plane 452, shown in FIG. 4, defines the cross-section shown in FIG. 14. The cut-away show that the first and second structural frame exterior sidewalls (336 and 338) of the structural frame 206 as well as the first and second cylinder block exterior sidewalls (333 and 335) of the cylinder block 204 may vary in thickness. FIG. 14 also shows the cylinder head engaging surfaces (322 and 324).

Figure 15:
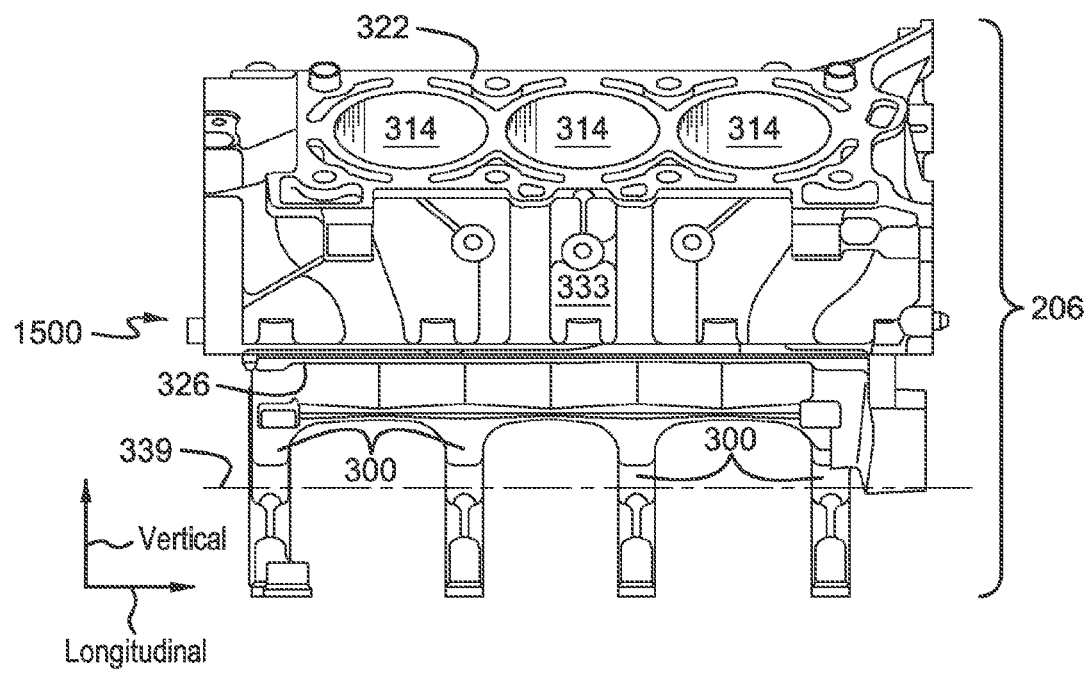
FIGS. 15 and 16 show side views of the cylinder block shown in FIG. 3.
Figure 16:
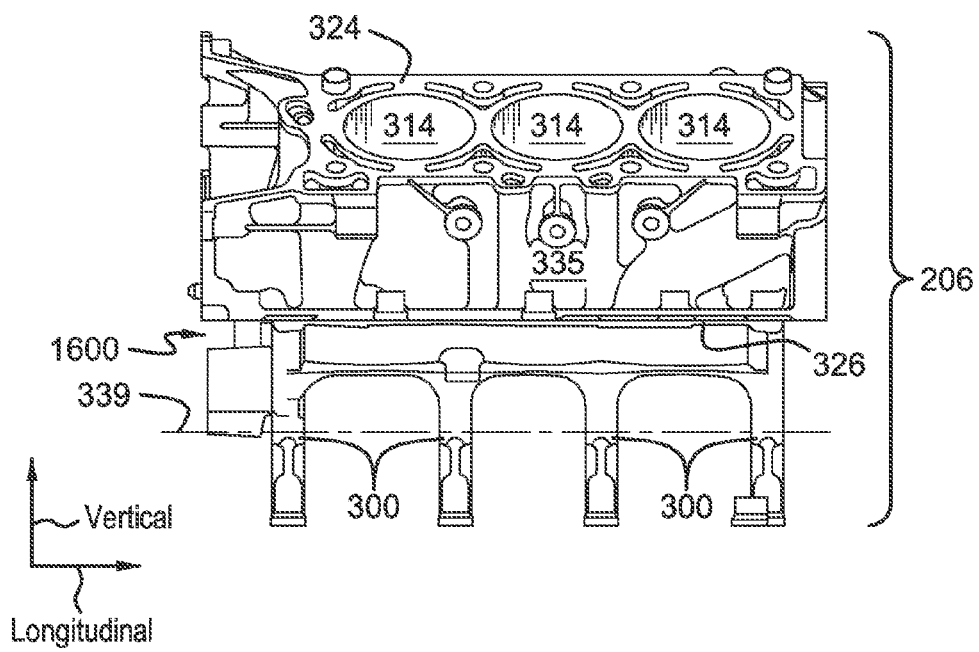

FIG. 15 shows a side view of the structural frame 206. As shown, the crankshaft supports 300 extend in a vertical direction. However, in other examples the crankshaft supports may have an alternate orientation and/or geometry. The cylinder head engaging surface 322, the first cylinder block sidewall 333, the structural frame engaging surface 326, and the centerline 339 of the plurality of crankshaft supports 300 are also shown in FIG. 15. As previously discussed, the structural frame engaging surface 326 is positioned vertically above the centerline 339. FIG. 16 shows another side view of the structural frame 206. FIG. 16 additionally shows the cylinder head engaging surface 324, the second cylinder block exterior sidewall 335, the second structural frame engaging surface 328, and the centerline 339.

Figure 17:
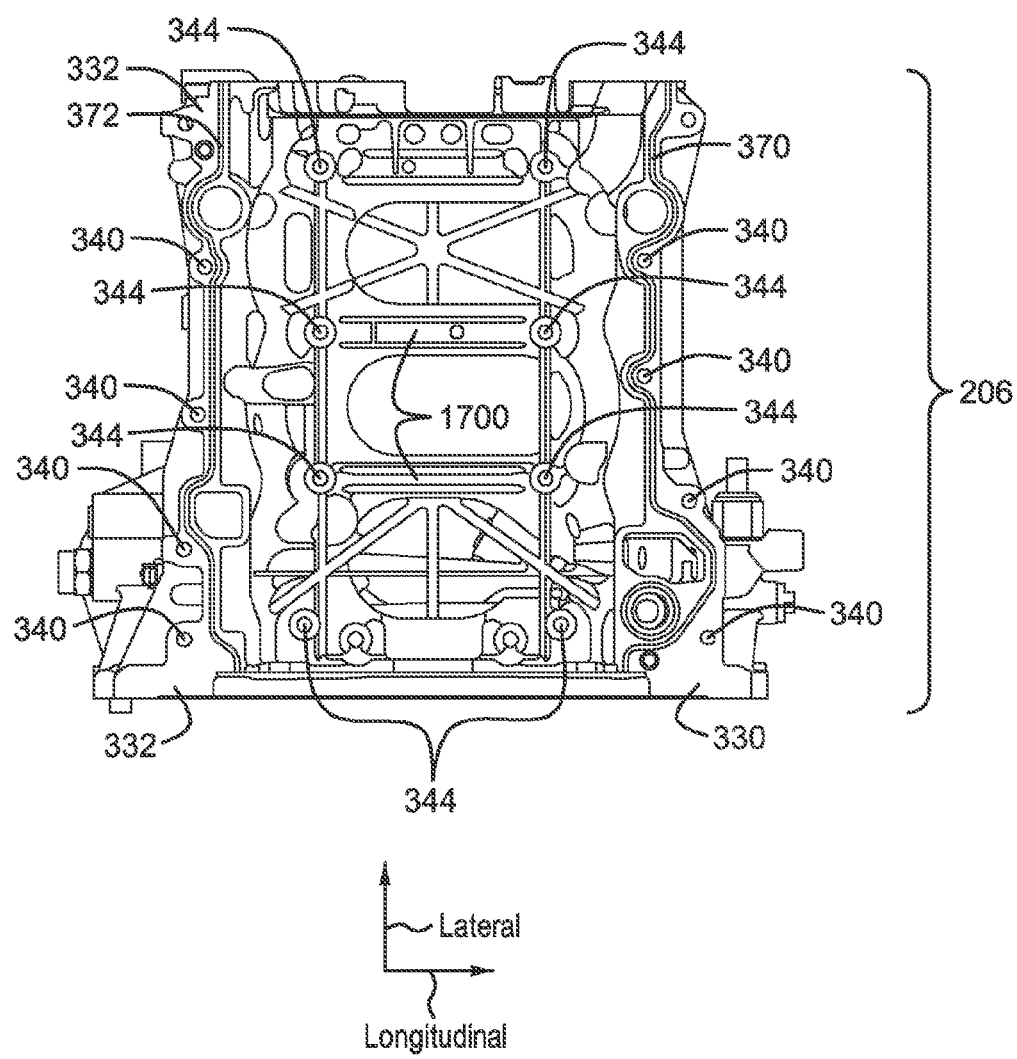
FIG. 17 shows a top view of the structural frame shown in FIG. 3.

FIG. 17 shows a top view if the interior of the structural frame 206. As shown, supports 1700 may laterally extend across the structural frame 206. The supports are laterally and longitudinally aligned with the bearing caps to provide increased support to the cylinder block, thereby increasing the cylinder block assembly's strength and reducing NVH during engine operation. As shown, the fastener openings 344 are located near the lateral periphery of the supports 1700. Additionally, the cylinder block sidewall engaging surfaces (330 and 332) and the fastener openings 340 included in the cylinder block sidewall engaging surfaces (330 and 332) are shown. The first seal 370 and the second seal 372 are also shown in FIG. 17.

Figure 18:
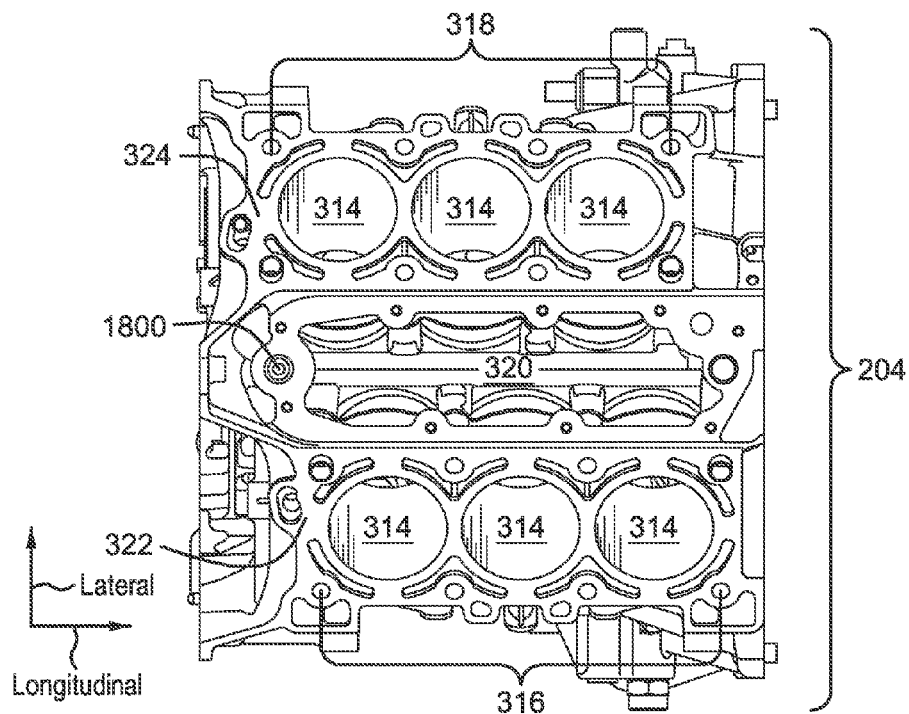
FIG. 18 shows a top view of the cylinder block assembly shown in FIG. 4.

FIG. 18 shows a top view of the cylinder block 204. Cylinders 314 are arranged in two groups of three cylinders. However, in alternative examples, cylinder block 204 may be comprised of a single cylinder, two groups of four cylinders, two groups of two cylinders, or two groups of one cylinder. The groups of cylinder may be referred to as cylinder banks. As shown, the two groups of three cylinders are offset from each other in a longitudinal direction. In this example, cylinder block 204 is configured for over head camshafts. However, in alternative examples, cylinder block 204 may be configured for a push-rod configuration. Additionally, the valley 320 between the cylinder banks is shown. A lubrication passage 1800 may be fluidly coupled to the cooler 260, shown in FIGS. 3 and 4, positioned in the valley 320. In this way, the lubrication passage 1800 may be positioned to receive oil from cooler 260. Specifically, the lubrication passage 1800 may receive oil from cooler 260. The lubrication passage 1800 may be fluidly coupled to an oil gallery included in the structural frame 206 and/or an oil gallery included in the cylinder block 204. The cylinder head engaging surfaces (322 and 324) are also shown in FIG. 18.

FIG. 19 shows a view of the bottom 1900 of the cylinder block 204. The structural frame attachment recesses 306 are positioned proximate to the lateral periphery of the bottom surfaces 308 of the bearing caps 304. However, the attachment recesses 306 may be positioned in another suitable location in other examples. As previously discussed, the cylinder block 204 includes a first and second structural frame engaging surface (326 and 328) having fastener opening 334 configured to receive fasteners for coupling the cylinder block 204 to the structural frame 206, shown in FIG. 3.

Figure 20:
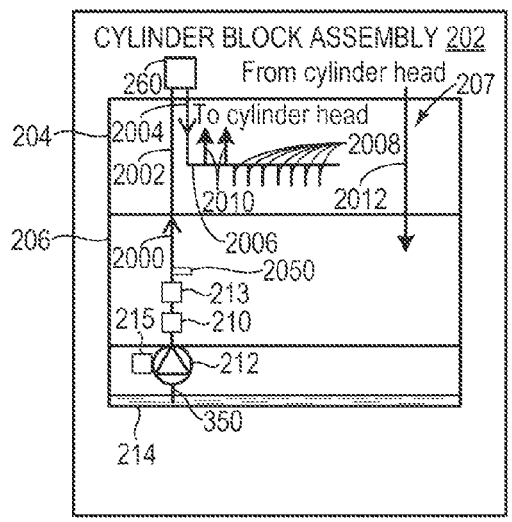
FIG. 20 shows a schematic depiction of a lubrication circuit.

FIG. 20 shows a schematic depiction of a lubrication system in the engine 10. It will be appreciated that the lubrication circuit may have additional complexity that not shown in FIG. 20. The structural complexity of the lubrication system is described in greater detail herein with regard to FIGS. 21-27.

Referring to FIG. 20, it shows a detailed schematic depiction of lubrication circuit 207, shown in FIG. 2. As shown, the lubrication circuit 207 may be configured to direct oil or other suitable lubricant through lubrication passages in the cylinder block assembly 202, and in particular, through cylinder block 204 as well as the structural frame 206. It will be appreciated that the lubrication passages may have additional complexity that is not depicted. Exemplary lubrication passages are shown in FIGS. 21-27, discussed in greater detail herein. Oil pump 212 may be configured to draw oil through the pick-up 350 disposed in oil pan 214 and flow oil into a lubrication passage 2000 traversing the structural frame 206. The oil filter 210 and the solenoid valve 213 may be fluidly coupled to the lubrication passage 2000. In this way, both the oil filter 210 and the solenoid valve 213 may be in fluidic communication with the lubrication passage 2000. The solenoid valve 213 may be configured to decrease oil pressure in the structural frame lubrication passage 2000 when a pressure of the structural frame lubrication passage exceeds a threshold value. However, in other embodiments alternate control schemes are possible.

It will be appreciated that the depicted positioning of the oil filter and solenoid valve are exemplary. Therefore, in other embodiments the oil filter 210 and solenoid valve 213 may be positioned in alternate suitable locations. The lubrication passage 2000 may be fluidly coupled to a lubrication passage 2002 traversing the cylinder block 204. The lubrication passage 2002 may be in fluidic communication with the cooler 260. As previously discussed, the cooler 260 may be configured to remove heat from the lubricant (e.g., oil) in the lubrication circuit. In some embodiments, the cooler 260 may include water passage for transferring heat from the lubricant to the water.

Lubrication passage 2004 traversing a portion of the cylinder block 204 may be fluidly coupled to an outlet of the cooler 260. In this way, lubricant may be flowed from the cooler 260 to the lubrication passage 2004.

The lubrication passage 2004 may be in fluidic communication with a central lubrication passage 2006. A plurality of crankshaft lubrication branch passages 2008 may be fluidly coupled to the central lubrication passage 2006.

The crankshaft lubrication branch passages 2008 may be configured to provide components of the crankshaft such as journals, bearing, etc., with lubricant. It will be appreciated that the outlets of the crankshaft lubrication branch passages may open into the crankcase. In this way, lubricant may be provided to the crankshaft and subsequently drained into the oil pan 214. Lubrication passages 2010 respectively, may also be in fluidic communication with the central lubrication passage 2006 and traverse a portion of the cylinder block 204. The lubrication passages 2010 may be in fluidic communication with lubrication passages included in the cylinder head 200 shown in FIG. 2.

The lubrication circuit 207 may further include a return lubrication passage 2012 traversing the cylinder block 204. The return lubrication passage 2012 may include an inlet fluidly coupled to a cylinder head lubrication passage included in the cylinder head 200 shown in FIG. 2 and an outlet opening into the crankcase. In this way, oil may be drained into the oil pan from the cylinder head 200, shown in FIG. 2. Additionally, a pressure sensor 2050 may be coupled to lubrication passage 2000. The pressure sensor may be in electronic communication with controller 12.

In some examples, an amount of oil or an oil pressure provided by oil pump 212 may be varied by a controller, such as controller 10 shown in FIGS. 1 and 2 or another suitable controller, according to engine operating conditions. In one example, the oil pump may be electrically driven. In other examples, the pumping efficiency of a mechanically driven pump may be adjusted via adjusting a feature of oil pump 212 (e.g., a vane or pressure regulator) or the solenoid valve 213. An oil bypass system 215 may also be included in the lubrication circuit 207. The oil bypass system 215 is discussed in greater detail herein. FIGS. 21-27 show an example routing of the lubrication circuit 207 in the cylinder block assembly 202. Cutting planes (450, 452, 454, 456, 458, and 460), shown in FIG. 4, define the cross-sections shown in FIGS. 21-27, respectively.

Figure 21:
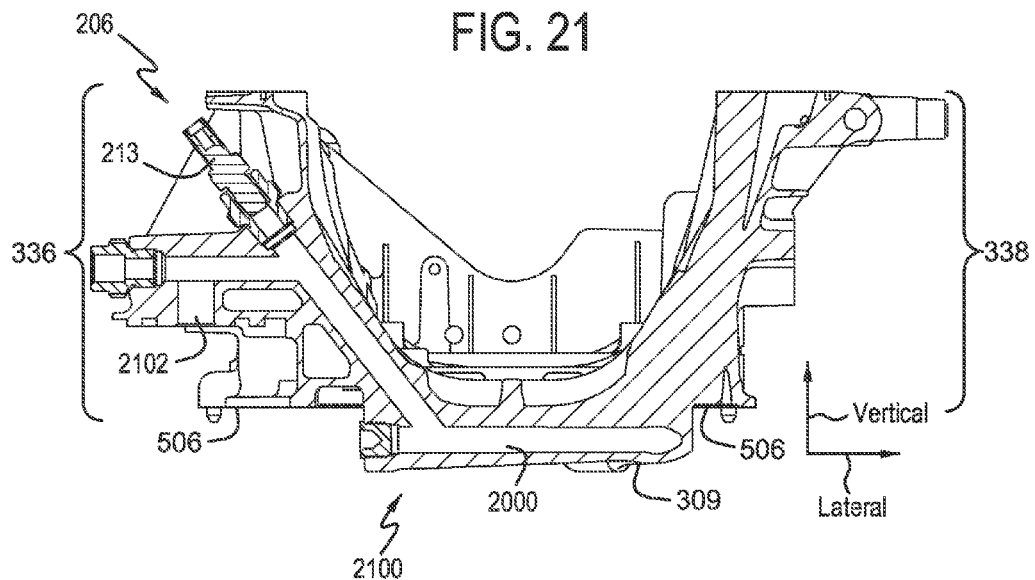

FIG. 21 shows a cross-section of the structural frame 206. As shown, a structural frame lubrication passage 2000, included in lubrication circuit 207 shown in FIG. 20, may extend through the first structural frame exterior sidewall 336 as well as through a bottom portion 2100 of the structural frame 206. The bottom portion 2100 may extend from the first structural frame exterior sidewall 336 to the second structural frame exterior sidewall 338. Specifically, the structural frame lubrication passage 2000 is adjacent to the oil pan engaging surface 506 and the bottom surface 309. Furthermore, the lubrication passage 2000 traverses a portion of the structural frame 206 adjacent an end of the structural frame that attaches to the transmission bell housing. However, in other embodiments, the lubrication passage 2000 may be positioned in another location in the structural frame 206.

As previously discussed, the solenoid valve 213 is fluidly coupled to the lubrication passage 2000. The solenoid valve may be configured to decrease the pressure in the lubrication passage 2000 when the pressure in the passage exceeds a threshold value. However, in other embodiment the solenoid valve may have an alternate functionality. The inlet 510 shown in FIG. 5 may be the inlet of lubrication passage 2000.

The inlet 510 may be fluidly coupled to the outlet 352 of the pump 212, shown in FIGS. 3 and 20. In this way, lubrication passage 2000 is supplied with oil from the pump 212. Furthermore, the oil filter 210, shown in FIGS. 3 and 20 may be fluidly coupled to the structural frame lubrication passage 2000 via port 2102. As previously discussed, the oil filter 210 may be configured to remove contaminants from the oil in the lubrication circuit 207, shown in FIG. 20.

Figure 22:
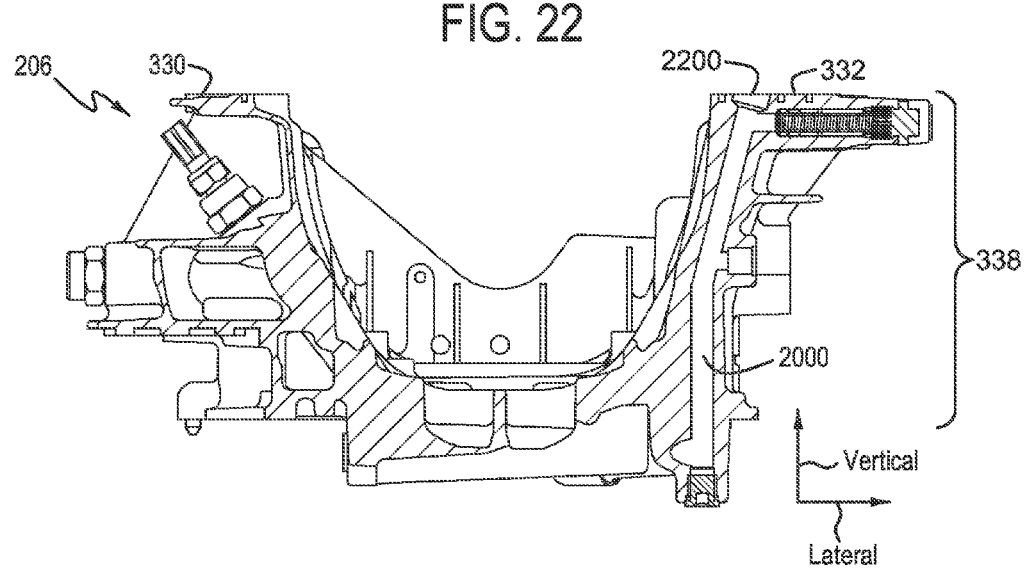

FIG. 22 shows another cross-section of the structural frame 206 including another portion of the structural frame lubrication passage 2000, shown in FIG. 21. As shown in FIG. 22, the structural frame lubrication passage 2000 traverses the second structural frame exterior sidewall 338. The structural frame lubrication passage 2000 is laterally offset. However, in other embodiments other alignments are possible. For example, the structural frame lubrication passage 2000 may be laterally aligned in other embodiments. The structural frame lubrication passage 2000 also includes an outlet 2200. As shown, the outlet 2200 is positioned in the second cylinder block sidewall engaging surface 332. However, in other embodiments the outlet may be positioned in the first cylinder block sidewall engaging surface 330. In this way, the outlet 2200 is located at one of the first and second cylinder block sidewall engaging surfaces (330 and 332). However in other embodiments, the outlet 2200 may be positioned in another suitable location such as in one of the structural frame exterior sidewalls (336 and 338).

Further in the depicted embodiment the structural frame lubrication passage is adjacent to an end of the structural frame that attaches to a transmission bell housing. However, in other embodiments the structural frame lubrication passage 2000 may be spaced away from the end of the structural frame that attaches to the transmission bell housing.

It will be appreciated that when the lubrication passage is integrated into the structural frame 206, external lubrication lines may not be needed to route lubricant from the pump. As a result, the compactness of the engine may be increased. Furthermore, the likelihood of rupturing a lubrication line during installation may be reduced and in some cases substantially eliminated when lubrication passages are internally routed through the structural frame.

Figure 23:
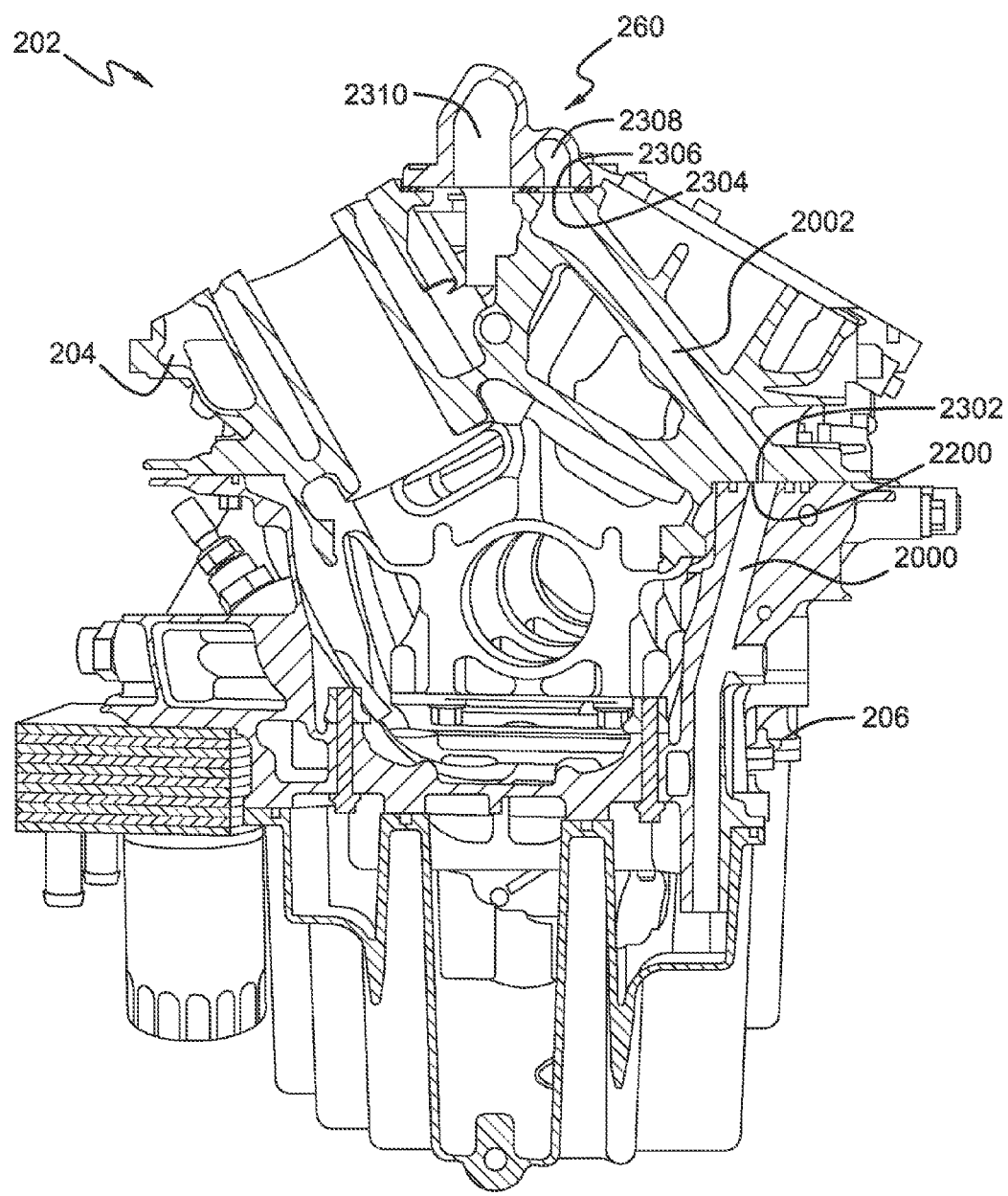

FIG. 23 shows a cross-sectional view of the cylinder block assembly 202. As shown, a cylinder block lubrication passage 2002 is included in the cylinder block 204. The cylinder block lubrication passage 2300 includes an inlet 2302 in fluidic communication with the outlet 2200 of the structural frame lubrication passage 2000. In this way, the cylinder block lubrication passage 2002 provides fluidic communication between the second structural frame engaging surface 328 and the second cylinder block sidewall engaging surface 332. However, in other embodiments, the cylinder block lubrication passage 2002 may provide fluidic communication between the first structural frame engaging surface 326 and the first cylinder block sidewall engaging surface 330. The cylinder block lubrication passage 2002 may further include an outlet 2304. The outlet may be fluidly coupled to an inlet 2306 of the cooler 260. As shown, the inlet 2306 is positioned in the valley 320 between the first and second cylinder banks (316 and 318) shown in FIG. 18. Continuing with FIG. 23, the inlet 2306 of the cooler 260 may be an inlet to a passage 2308 within the cooler 260. Cooler 260 may also include another passage 2310 through which coolant is routed.

Figure 24:
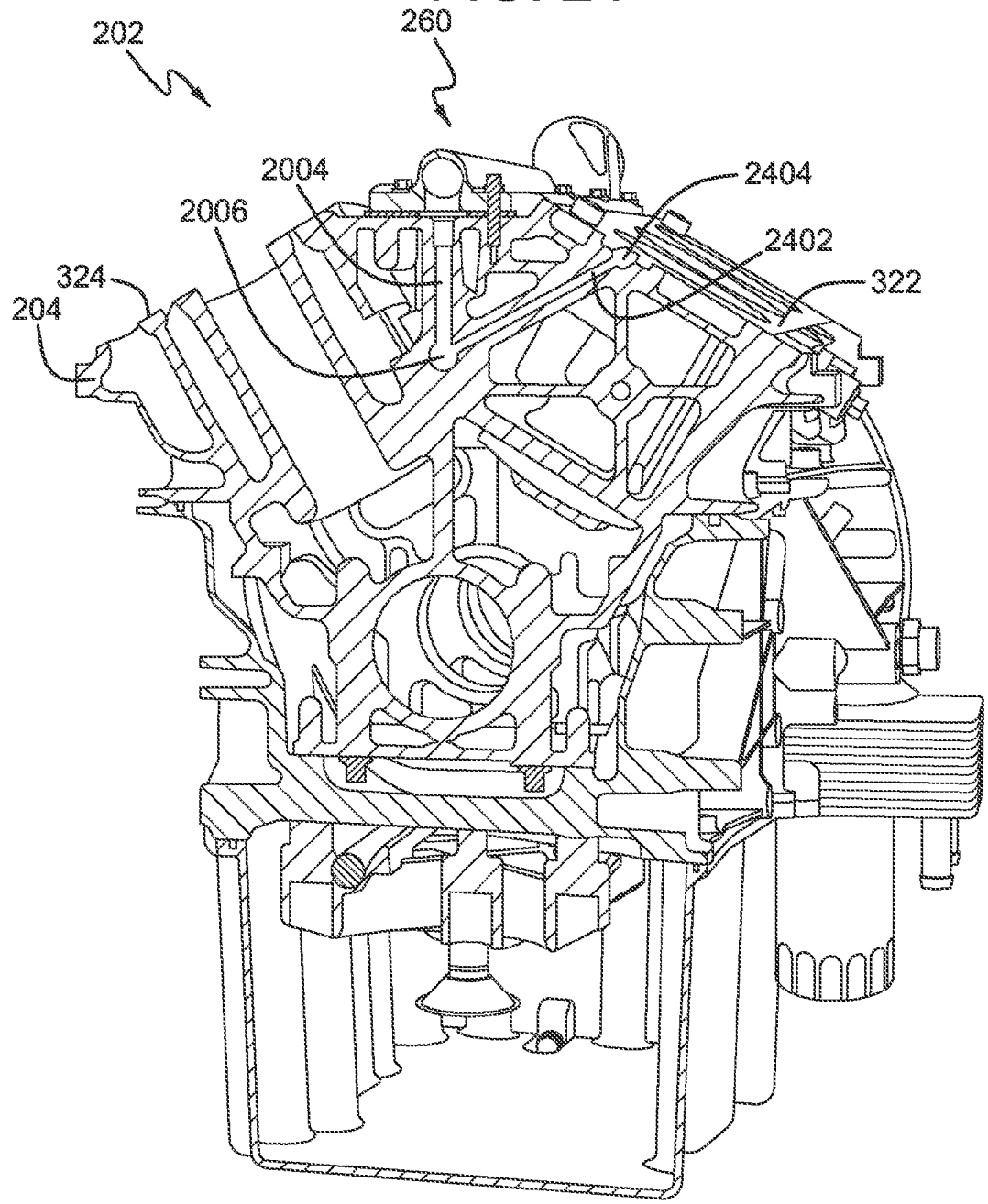

FIG. 24 shows another cross-sectional view of the cylinder block assembly 202. A passage in the cooler 260 is in fluidic communication to the lubrication passage 2402. It will be appreciated that the passage 2400 may be fluidly coupled to passage 2308, shown in FIG. 23. In this way, lubricant may be flowed through the cooler 260 into the lubrication passage 2004 in the cylinder block 204. The lubrication passage 2004 extends vertically through the cylinder block 206 and is in fluidic communication with the central lubrication passage 2006. The lubrication passage 2004 may be adjacent to the exterior front wall 310, shown in FIG. 3, of the cylinder block 204. However, in other embodiments alternate orientations are possible. Furthermore the central lubrication passage 2006 is fluidly coupled to the lubrication passage 2402 included in the plurality of lubrication passages 2010 shown in FIG. 20. The lubrication passage 2402 extends through the cylinder block 204 to the first cylinder head engaging surface 322 adjacent to a cylinder. However, in other embodiments alternate orientations are possible. For example, the lubrication passage 2402 may extend through the cylinder block 204 to the second cylinder head engaging surface 324. An outlet 2404 of the lubrication passage 2402 may be fluidly coupled to a lubrication passage (not shown) in the cylinder head 200, shown in FIG. 2.

Figure 25:
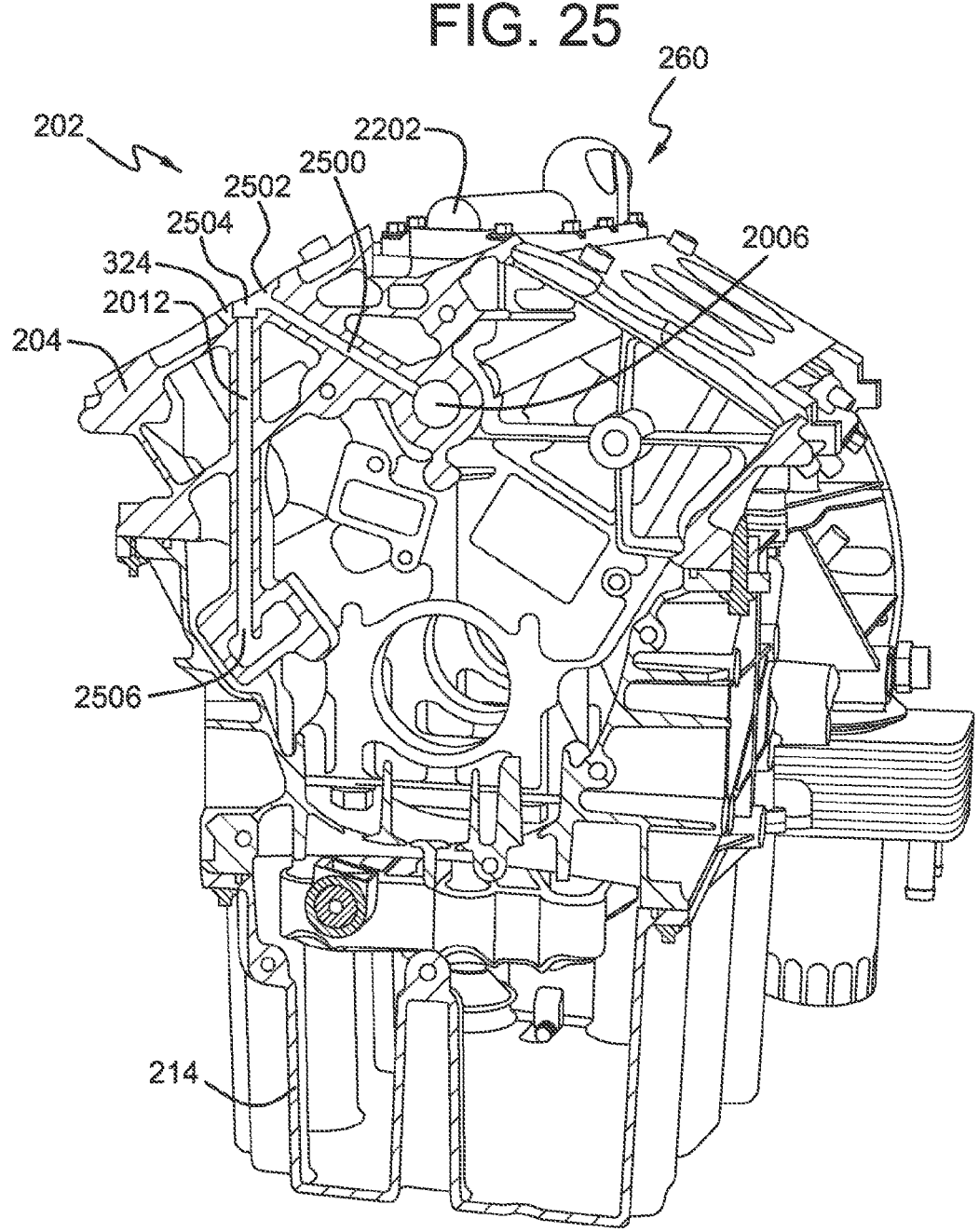

FIG. 25 shows another cross-sectional view of the cylinder block assembly 202. Another section of the central lubrication passage 2006 is depicted. A lubrication passage 2500 included in the plurality of lubrication passages 2010 may be in fluidic communication with the central lubrication passage 2006. The lubrication passage 2500 includes an outlet 2502 that may be coupled to a lubrication passage (not shown) in the cylinder head 200 shown in FIG. 3. The lubrication passage 2500 extends through the cylinder block 204 to the second cylinder head engaging surface 324. The lubrication passage 2500 may also be adjacent to the exterior front wall 310, shown in FIG. 3, of the cylinder block 204. However, in other embodiments the lubrication passage 2500 may have another orientation and/or location. The lubrication passage 2012 also extends through the cylinder block 204. The lubrication passage 2012 includes an inlet 2504 and an outlet 2506. The inlet 2504 may be fluidly coupled to a lubrication passage (not shown) in the cylinder head 200, shown in FIG. 2. The outlet may open into the crankcase of the engine 10, shown in FIG. 2, or may be fluidly coupled to a lubrication passage opening into the crankcase. In this way, oil may be flowed back into the oil pan 214. Additionally or alternatively, the outlet 2502 of the lubrication passage 2500 may be fluidly coupled to the lubrication passage 2012.

Figure 26:
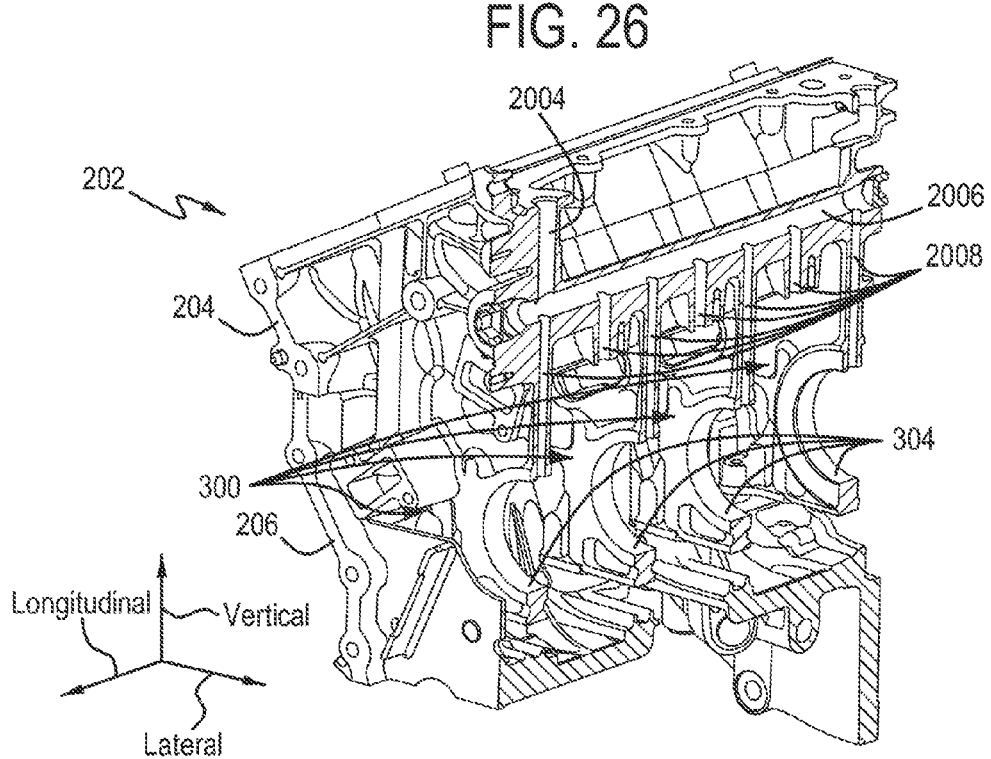
FIGS. 21-27 show an embodiment of the lubrication circuit included in the cylinder block assembly shown in FIGS. 2 and 20.

FIG. 26 shows a cross-section of the cylinder block 204. FIG. 26 shows the central lubrication passage 2006. As previously discussed, the central lubrication passage 2006 longitudinally traverses the cylinder block 204 and is adjacent to the bearing caps 304 included in the cylinder block 204. Crankshaft lubrication branch passages 2008 may be fluidly coupled to central lubrication passage 2006. As shown, the crankshaft lubrication branch passages extend vertically through the cylinder block. In this way, the crankshaft lubrication branch passages 2008 may be vertically oriented. However, in other examples, alternate orientations are possible. The branch passages 2008 may include outlets opening into a crankcase. A portion of the crankshaft lubrication branch passages extend through the bearing caps 304, thereby providing lubrication to the crankshaft bearing. In this way, at least one of the crankshaft lubrication branch passages may extend through a portion of one of the crankshaft supports 300. Another portion of the crankshaft lubrication branch passages 2008 extend towards piston cooling jets, thereby cooling pistons for more optimal engine operation. In this way, increased lubrication may be provided to various engine components. Moreover, in previous engines having a V type cylinder configuration, the depression between the cylinder banks is vacant of components. In this way, increased lubrication may be provided to the engine without decreasing the engine's compactness. Of course, the diameter of crankshaft lubrication branch passages 2008 may vary from branch to branch so that similar amounts of oil may be transferred to each crankshaft bearing. The previous mentioned depression may contain coolant water that could be utilized by cooler 260 shown in FIGS. 3 and 4. The configuration promotes coolant water flow while decreasing and in some cases minimizing wall structure (reducing weight) that in previous engine configurations is normally a full housing around the cylinder coolant water passage.

In this way, lubricant may be routed internally through the cylinder block assembly 202. As a result the compactness of the cylinder block assembly may be increased. When lubricant is internally routed through the cylinder block assembly the number of external lubrication lines in the cylinder block assembly may be reduced and in some cases eliminated. As a result, the assembly of the cylinder block assembly 202 may be simplified, thereby reducing manufacturing costs. Furthermore, when fewer or no external lubrication lines are utilized the likelihood or rupturing a lubrication line during assembly is reduced and in some cases substantially eliminated.

Figure 27:
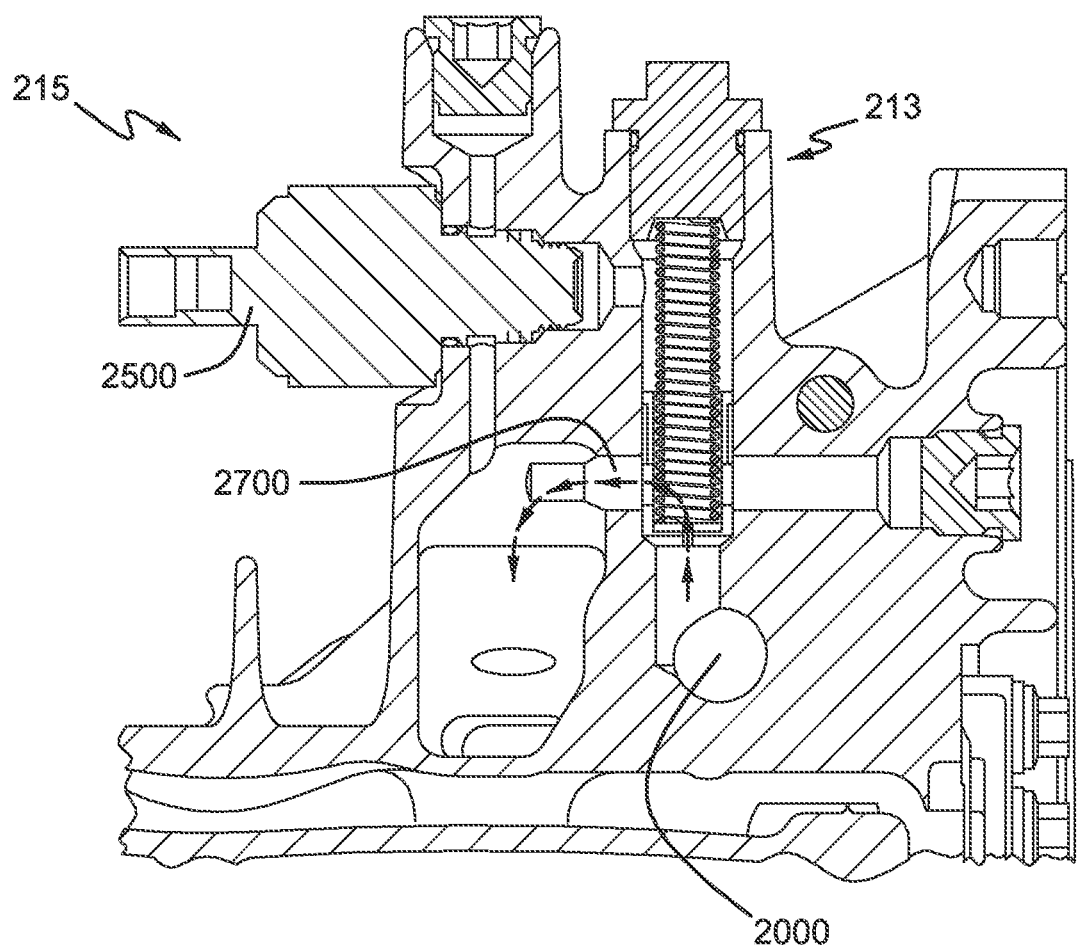

FIG. 27 shows a detailed view of an oil bypass system 215 that may be included in cylinder block assembly 202. The oil bypass system may be coupled to the solenoid valve 213. Solenoid valve 213 may be configured to re-direct oil into an oil bypass passage 2700 from lubrication passage 2000 during certain operating conditions such as during low flow conditions. In this way, the strain on oil pump 212 may be reduced, thereby increasing the pump's longevity. The oil bypass passage 2700 may be in fluidic communication with oil pan 214, shown in FIGS. 2 and 3. Additionally, solenoid valve 213 may be actively controlled via controller 12 shown in FIG. 2.

FIGS. 1-27 and the corresponding description provide for a cylinder block comprising a cylinder, two crankshaft supports at a bottom of the cylinder block, a cylinder head engaging surface at a top of the cylinder block, and first and second sidewalls extending from the cylinder head engaging surface to a structural frame engaging surface positioned above a centerline of two crankshaft supports, and a lubrication passage providing fluidic communication between the structural frame engaging surface and the cylinder head engaging surface. Furthermore, the lubrication passage may include an inlet positioned at the structural frame engaging surface and an outlet positioned at the cylinder head engaging surface.

Additionally, the lubrication passage may include an outlet located in a valley between a first bank of cylinders and a second bank of cylinders, where the outlet is in fluidic communication with an oil cooler, where the lubrication passage includes an inlet, and where the inlet is in fluidic communication with a structural frame lubrication passage.

FIGS. 1-27 may further provide for a cylinder block where the cylinder block lubrication passage is adjacent to a cylinder block front wall that includes one of the crankshaft supports. FIGS. 1-27 may further provide for a cylinder block where the cylinder block lubrication passages traverses a portion of the cylinder block adjacent to a cylinder. Additionally, the cylinder block lubrication passage may include a central lubrication passage adjacent to bearing caps in the crankshaft supports.

FIGS. 1-27 may further provide for a cylinder block comprising a cylinder, two crankshaft supports at a bottom of the cylinder block, a cylinder head engaging surface at a top of the cylinder block, first and second sidewalls extending from the cylinder head engaging surface to a first structural frame engaging surface positioned above a centerline of the two crankshaft supports, and a cylinder block lubrication passage traversing a portion of the cylinder block, the cylinder block lubrication passage including an inlet in fluidic communication with a structural frame lubrication passage and an outlet in fluidic communication with a cylinder head lubrication passage.

The cylinder block may further include a central lubrication passage in fluidic communication with a cooler in fluidic communication with the cylinder block lubrication passage, the central lubrication passage in fluidic communication with branch passages opening into a crankcase.

The cylinder block may further include a second cylinder block lubrication passage in fluidic communication with the central lubrication passage and a cylinder head lubrication passage traversing a cylinder head, the cylinder head coupled to the cylinder block. The cylinder block may further include a return lubrication passage in fluidic communication with a cylinder head lubrication passage and having an outlet opening into a crankcase.

The cylinder block may further include a second cylinder and a valley between the first and second cylinders. FIGS. 1-27 may further provide for a cylinder block where the second cylinder is positioned at a non-straight angle with respect to the first cylinder. The cylinder block may further include a solenoid valve coupled to the structural frame lubrication passage. The cylinder block may further include a crankshaft lubrication branch passages extending from a central lubrication passage traversing the cylinder block and in fluidic communication with the structural frame lubrication passage, at least one of the crankshaft lubrication branch passages extending through a portion of a crankshaft support.

FIGS. 1-27 may further provide for a cylinder block where the crankshaft lubrication branch passages are substantially vertically oriented and each crankshaft lubrication branch passage includes an opening positioned in an upper portion of a FIGS. 1-27 may further provide for a cylinder block where the cylinder block lubrication passage is adjacent to a cylinder.

Referring now to FIG. 28, it shows a method for operation of a lubrication circuit. Method 2800 may be implemented via the cylinder block assembly, components, etc., described above or may be implemented via other suitable cylinder block assemblies, components, etc.

At 2802, method 2800 includes flowing oil into an oil pump from an oil pan positioned vertically below a cylinder block assembly. In some examples, the oil pump may be coupled to the cylinder block assembly. In particular, the oil pump may be coupled to a structural frame. Therefore, the oil pump may be interposed via the cylinder block assembly and the oil pan.

Next at 2804, method 2800 includes flowing oil from the oil pump into a lubrication passage traversing a structural frame included in the cylinder block assembly. As discussed above, at least a portion of the structural frame may extend above a crankshaft centerline.

In some examples method 2806 may include flowing oil through an oil filter coupled to the structural frame. Next at 2808, method 2800 includes flowing oil through the lubrication passage traversing the structural frame. At 2810, method 2800 includes flowing oil from the lubrication passage traversing the structural frame into a lubrication passage traversing the cylinder block. At 2811, the method includes flowing oil through the lubrication passage traversing the cylinder block.

At 2812, the method includes flowing oil from the lubrication passage included in the cylinder block into a cooler positioned between a first and second cylinder bank.

At 2813, the method includes flowing lubricant from the cooler to a crankshaft assembly via lubrication passages traversing the cylinder block. The crankshaft assembly, may include a crankshaft, bearings, journals, etc., as previously discussed. Specifically in one embodiment, the lubrication passages may traverse crankshaft supports included in the cylinder block. At 2814, the method includes flowing lubricant from a lubrication passage traversing the cylinder block to a lubrication passage traversing the cylinder head. Next at 2816, the method includes decreasing a pressure of the lubricant in the structural frame lubrication passage when the pressure in the structural frame lubrication passage exceeds a threshold value.

Although method 2800 is discussed with regard to flowing oil through the cylinder block assembly, it will be appreciated that another suitable lubricant may be used in other embodiments.

FIG. 28 provides for a method for operation a lubrication system in an engine comprising flowing a lubricant from a lubrication passage traversing a structural frame into a lubrication passage traversing a cylinder block, the cylinder block coupled to the structural frame, the structural frame including two crankshaft supports and a structural frame engaging surface positioned above a centerline of the two crankshaft supports, flowing the lubricant through the lubrication passage traversing a cylinder block, and flowing the lubricant from the lubrication passage traversing the cylinder block to a lubrication passage traversing a cylinder head coupled to the cylinder block.

The method may further include flowing lubricant from the lubricant passage traversing the cylinder block to a crankshaft assembly via crankshaft lubrication passages fluidly coupled to the lubrication passage traversing the cylinder block.

FIG. 28 provides for a method wherein one or more of the crankshaft lubrication passages extend through a crankshaft support. Additionally, FIG. 28 provides for a method wherein the cylinder block and structural frame are coupled via the structural frame engaging surface included with the cylinder block and a cylinder block sidewall engaging surface included with the structural frame.

It will be appreciated that the configurations and/or approaches described herein are exemplary in nature, and that these specific examples or examples are not to be considered in a limiting sense, because numerous variations are possible. The subject matter of the present disclosure includes all novel and nonobvious combinations and subcombinations of the various features, functions, acts, and/or properties disclosed herein, as well as any and all equivalents thereof.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A cylinder block comprising:
a cylinder;
two crankshaft supports at a bottom of the cylinder block;
a cylinder head engaging surface at a top of the cylinder block;
first and second sidewalls extending from the cylinder head engaging surface to a structural frame engaging surface positioned above a centerline of a crankshaft supported by the two crankshaft supports; and
a cylinder block lubrication passage providing fluidic communication between the structural frame engaging surface and the cylinder head engaging surface, the cylinder block lubrication passage adjacent to a cylinder block front wall that includes one of the two crankshaft supports.

2. The cylinder block of claim 1, where the cylinder block lubrication passage includes an inlet positioned at the structural frame engaging surface and an outlet positioned at the cylinder head engaging surface.

3. The cylinder block of claim 1, where the cylinder block lubrication passage includes an outlet located in a valley between a first bank of cylinders and a second bank of cylinders, where the outlet is in fluidic communication with an oil cooler, where the cylinder block lubrication passage includes an inlet, and where the inlet is in fluidic communication with a structural frame lubrication passage, the structural frame lubrication passage traversing a structural frame, the structural frame coupled to the structural frame engaging surface, between an oil pump and the inlet, the oil pump coupled to an oil pan engaging surface of the structural frame.

4. The cylinder block of claim 3, where cylinders of the first bank of cylinders and cylinders of the second bank of cylinders are positioned at a non-straight angle with respect to one another.

5. The cylinder block of claim 1, where the cylinder block lubrication passage traverses a portion of the cylinder block adjacent to the cylinder.

6. The cylinder block of claim 1, where the cylinder block lubrication passage includes a central lubrication passage adjacent to bearing caps in the two crankshaft supports.

7. A cylinder block comprising:
a first cylinder;
two crankshaft supports at a bottom of the cylinder block;
a cylinder head engaging surface at a top of the cylinder block;
first and second sidewalls extending from the cylinder head engaging surface to a first structural frame engaging surface positioned above a centerline of a crankshaft supported by the two crankshaft supports; and
a cylinder block lubrication passage traversing a portion of the cylinder block and positioned adjacent to a cylinder block front wall that includes one of the two crankshaft supports, the cylinder block lubrication passage including an inlet in fluidic communication with a structural frame lubrication passage and an outlet in fluidic communication with a cylinder head lubrication passage, the structural frame lubrication passage traversing a structural frame coupled to the first structural frame engaging surface from an oil pump coupled to the structural frame and to the inlet.

8. The cylinder head of claim 7, further comprising a central lubrication passage in fluidic communication with a cooler in fluidic communication with the cylinder block lubrication passage, the central lubrication passage in fluidic communication with branch passages opening into a crankcase.

9. The cylinder head of claim 8, further comprising a second cylinder block lubrication passage in fluidic communication with the central lubrication passage and a cylinder head lubrication passage traversing a cylinder head, the cylinder head coupled to the cylinder block.

10. The cylinder block of claim 7, further comprising a return lubrication passage in fluidic communication with a cylinder head lubrication passage and having an outlet opening into a crankcase.

11. The cylinder block of claim 7, further comprising a second cylinder and a valley between the first and second cylinders.

12. The cylinder block of claim 11, where the second cylinder is positioned at a non-straight angle with respect to the first cylinder.

13. The cylinder block of claim 7, further comprising a solenoid valve coupled to the structural frame lubrication passage.

14. The cylinder block of claim 7, further comprising crankshaft lubrication branch passages extending from a central lubrication passage traversing the cylinder block and in fluidic communication with the structural frame lubrication passage, at least one of the crankshaft lubrication branch passages extending through a portion of a crankshaft support.

15. The cylinder block of claim 14, where the crankshaft lubrication branch passages are substantially vertically oriented and each crankshaft lubrication branch passage includes an opening positioned in an upper portion of the crankshaft support.

16. The cylinder block of claim 7, where the cylinder block lubrication passage is adjacent to a first cylinder.

17. A method for operation of a lubrication system in an engine comprising:
- flowing a lubricant from a lubrication passage traversing a structural frame into a lubrication passage traversing a cylinder block, the cylinder block coupled to the structural frame, the cylinder block including two crankshaft supports surrounding the circumference of a crankshaft supported by the two crankshaft supports and a structural frame engaging surface positioned above a centerline of the two crankshaft supports, the lubrication passage traversing the cylinder block positioned adjacent to a cylinder block front wall that includes one of the two crankshaft supports;
- flowing the lubricant through the lubrication passage traversing the cylinder block; and
- flowing the lubricant from the lubrication passage traversing the cylinder block to a lubrication passage traversing a cylinder head coupled to the cylinder block.

18. The method of claim 17, further comprising flowing the lubricant from the lubrication passage traversing the cylinder block to a crankshaft assembly via crankshaft lubrication passages fluidly coupled to the lubrication passage traversing the cylinder block.

19. The method of claim 17, wherein one or more of the crankshaft lubrication passages extend through a crankshaft support.

20. The method of claim 17, wherein the cylinder block and structural frame are coupled via the structural frame engaging surface included with the cylinder block and a cylinder block sidewall engaging surface included with the structural frame and further comprising flowing the lubricant from an oil pan coupled to the structural frame into the lubrication passage traversing the structural frame.

* * * * *